United States Patent
Dubey et al.

(10) Patent No.: US 10,336,036 B2
(45) Date of Patent: Jul. 2, 2019

(54) CEMENTITIOUS ARTICLE COMPRISING HYDROPHOBIC FINISH

(71) Applicant: United States Gypsum Company, Chicago, IL (US)

(72) Inventors: Ashish Dubey, Grayslake, IL (US); Yanfei Peng, Gurnee, IL (US)

(73) Assignee: United States Gypsum Company, Chicago, IL (US)

( * ) Notice: Subject to any disclaimer, the term of this patent is extended or adjusted under 35 U.S.C. 154(b) by 512 days.

(21) Appl. No.: 13/834,556

(22) Filed: Mar. 15, 2013

(65) Prior Publication Data

US 2014/0272402 A1    Sep. 18, 2014

(51) Int. Cl.
| | | |
|---|---|---|
| *B32B 13/14* | (2006.01) | |
| *C04B 26/04* | (2006.01) | |
| *C04B 26/06* | (2006.01) | |
| *C04B 26/08* | (2006.01) | |
| C04B 111/00 | (2006.01) | |
| C04B 111/27 | (2006.01) | |
| C04B 111/30 | (2006.01) | |

(52) U.S. Cl.
CPC .............. *B32B 13/14* (2013.01); *C04B 26/04* (2013.01); *C04B 26/045* (2013.01); *C04B 26/06* (2013.01); *C04B 26/08* (2013.01); *C04B 2111/0062* (2013.01); *C04B 2111/00293* (2013.01); *C04B 2111/00474* (2013.01); *C04B 2111/00629* (2013.01); *C04B 2111/27* (2013.01); *C04B 2111/30* (2013.01); *Y02W 30/92* (2015.05); *Y10T 428/269* (2015.01); *Y10T 428/31663* (2015.04)

(58) Field of Classification Search
None
See application file for complete search history.

(56) References Cited

U.S. PATENT DOCUMENTS

| | | |
|---|---|---|
| 3,389,042 A | 6/1968 | Bieri et al. |
| 3,847,633 A | 11/1974 | Race |
| 3,993,822 A | 11/1976 | Knauf et al. |
| 4,065,597 A | 12/1977 | Gillespie et al. |
| 4,195,110 A | 3/1980 | Dierks et al. |
| 4,229,329 A | 10/1980 | Bennett |
| 4,242,406 A | 12/1980 | El Bouhnini et al. |
| 4,265,979 A | 5/1981 | Baehr et al. |
| 4,292,364 A | 9/1981 | Wesch et al. |
| 4,303,722 A | 12/1981 | Pilgrim |
| 4,311,767 A | 1/1982 | Kennedy |
| 4,315,967 A | 2/1982 | Prior et al. |
| 4,378,405 A | 3/1983 | Pilgrim |
| 4,528,238 A | 7/1985 | Alford |
| 4,572,861 A | 2/1986 | Barretto Garcia et al. |
| 4,647,496 A | 3/1987 | Lehnert et al. |
| 4,745,032 A | 5/1988 | Morrison |
| 4,784,897 A | 11/1988 | Brands et al. |
| 4,810,569 A | 3/1989 | Lehnert et al. |
| 4,816,091 A | 3/1989 | Miller |
| 4,879,173 A | 11/1989 | Randall |
| 4,948,647 A | 8/1990 | Burkard |
| 5,102,728 A | 4/1992 | Gay et al. |
| 5,112,678 A | 5/1992 | Gay et al. |
| 5,342,680 A | 8/1994 | Randall |
| 5,395,685 A | 3/1995 | Seth et al. |
| 5,397,631 A | 3/1995 | Green et al. |
| 5,432,680 A | 7/1995 | Tsuchida et al. |
| 5,552,187 A | 9/1996 | Green et al. |
| 5,643,510 A | 7/1997 | Sucech |
| 5,644,880 A | 7/1997 | Lehnert et al. |
| 5,683,635 A | 11/1997 | Sucech et al. |
| 5,691,014 A | 11/1997 | Andersen et al. |
| 5,714,001 A | 2/1998 | Savoly et al. |
| 5,718,785 A | 2/1998 | Randall |
| 5,723,226 A | 3/1998 | Francis et al. |
| 5,772,846 A | 6/1998 | Jaffee |
| 5,837,621 A | 11/1998 | Kajander |
| 5,961,900 A | 10/1999 | Wedi |
| 5,965,257 A | 10/1999 | Ahluwalia |
| 5,981,630 A | 11/1999 | Banthia et al. |

(Continued)

FOREIGN PATENT DOCUMENTS

| | | |
|---|---|---|
| DE | 10109264 A1 | 9/2002 |
| GB | 2316693 A | 3/1998 |
| WO | WO 125562 A1 | 4/2001 |
| WO | WO 2004094743 A2 | 11/2004 |
| WO | WO 2005103367 A2 | 11/2005 |
| WO | WO 2006/113379 A2 | 10/2006 |
| WO | WO 2008027199 A2 | 3/2008 |
| WO | WO 2009/007994 A2 | 1/2009 |

(Continued)

OTHER PUBLICATIONS

International Search Report and Written Opinion from PCT/US2014/024207 (dated Dec. 11, 2014).

*Primary Examiner* — Cheng Yuan Huang

(74) *Attorney, Agent, or Firm* — Leydig, Voit & Mayer, Ltd; Philip T. Petti; Pradip K. Sahu

(57) ABSTRACT

Disclosed are cementitious articles with hydrophobic finish. In some embodiments, the article is a waterproof gypsum panel that is surface reinforced with inorganic mineral fibers that face a flexible and hydrophobic cementitious finish possessing beneficial waterproofing properties. The waterproof gypsum panels of the invention are useful in many applications, such as, for example, tilebacker board in wet or dry areas of buildings, exterior weather barrier panel for use as exterior sheathing, and roof cover board having superior water durability and extremely low surface absorption. The flexible and hydrophobic cementitious finish of the invention can include Class C fly ash, film-forming polymer, silane compound (e.g., alkyl alkoxysilane), and other optional additives.

18 Claims, 22 Drawing Sheets

(56) References Cited

U.S. PATENT DOCUMENTS

| | | |
|---|---|---|
| 6,001,496 A | 12/1999 | O'Haver-Smith |
| 6,054,205 A | 4/2000 | Newman et al. |
| 6,221,521 B1 | 4/2001 | Lynn et al. |
| 6,254,817 B1 | 7/2001 | Cooper et al. |
| 6,342,284 B1 | 1/2002 | Yu et al. |
| 6,391,131 B1 | 5/2002 | Newman et al. |
| 6,402,779 B1 | 6/2002 | Colone et al. |
| 6,406,535 B1 | 6/2002 | Shintone |
| 6,494,609 B1 | 12/2002 | Wittbold et al. |
| 6,508,895 B2 | 1/2003 | Lynn et al. |
| 6,524,679 B2 | 2/2003 | Hauber et al. |
| 6,555,199 B1 | 4/2003 | Jenkines |
| 6,620,487 B1 | 9/2003 | Tonyan et al. |
| 6,632,550 B1 | 10/2003 | Yu et al. |
| 6,641,658 B1 | 11/2003 | Dubey |
| 6,716,293 B2 | 4/2004 | Taymourian et al. |
| 6,723,670 B2 | 4/2004 | Kajander et al. |
| 6,737,156 B2 | 5/2004 | Koval et al. |
| 6,749,897 B2 | 6/2004 | Naji et al. |
| 6,770,354 B2 | 8/2004 | Randall et al. |
| 6,774,146 B2 | 8/2004 | Savoly et al. |
| 6,800,131 B2 | 10/2004 | Yu et al. |
| 6,808,793 B2 | 10/2004 | Randall et al. |
| 6,858,550 B2 | 2/2005 | Ahluwalia |
| 6,866,492 B2 | 3/2005 | Hauber et al. |
| 6,869,474 B2 | 3/2005 | Perez-Pena et al. |
| 6,874,930 B2 | 4/2005 | Wittbold et al. |
| 6,875,308 B2 | 4/2005 | Kajander et al. |
| 6,878,321 B2 | 4/2005 | Hauber et al. |
| 6,913,819 B2 | 7/2005 | Wallner |
| 6,916,863 B2 | 7/2005 | Hemmings et al. |
| 6,986,812 B2 | 1/2006 | Dubey et al. |
| 6,995,098 B2 | 2/2006 | McGrady et al. |
| 7,045,474 B2 | 5/2006 | Cooper et al. |
| 7,138,346 B2 | 11/2006 | Bush et al. |
| 7,235,288 B2 | 6/2007 | Kajander et al. |
| 7,238,402 B2 | 7/2007 | Swales et al. |
| 7,300,515 B2 | 11/2007 | Porter |
| 7,338,702 B2 | 3/2008 | Swales et al. |
| 7,347,895 B2 | 3/2008 | Dubey |
| 7,399,718 B2 | 7/2008 | Neumann et al. |
| 7,407,545 B2 | 8/2008 | Wallner |
| 7,429,544 B2 | 9/2008 | Grove et al. |
| 7,435,369 B2 | 10/2008 | Hennis et al. |
| 7,445,738 B2 | 11/2008 | Dubey et al. |
| 7,468,154 B2 | 12/2008 | Dubey |
| 7,473,440 B2 | 1/2009 | Kajander |
| 7,520,948 B2 | 4/2009 | Tavy et al. |
| 7,524,386 B2 | 4/2009 | George et al. |
| 7,553,780 B2 | 6/2009 | Smith |
| 7,635,657 B2 | 12/2009 | Bland et al. |
| 7,637,996 B2 | 12/2009 | Blackburn et al. |
| 7,645,490 B2 | 1/2010 | Bush et al. |
| 7,645,829 B2 | 1/2010 | Tse et al. |
| 7,670,427 B2 | 3/2010 | Perez-Pena et al. |
| 7,670,520 B2 | 3/2010 | Dubey et al. |
| 7,704,316 B2 | 4/2010 | Naji et al. |
| 7,732,032 B2 | 6/2010 | Dubey |
| 7,740,700 B2 | 6/2010 | Wallner |
| 7,745,357 B2 | 6/2010 | Smith et al. |
| 7,749,928 B2 | 6/2010 | Smith et al. |
| 7,763,134 B1 | 7/2010 | Kumar |
| 7,767,019 B2 | 8/2010 | Liu et al. |
| 7,776,461 B2 | 8/2010 | Blackburn et al. |
| 7,776,462 B2 | 8/2010 | Liu et al. |
| 7,789,645 B2 | 9/2010 | Dubey et al. |
| 7,790,240 B2 | 9/2010 | Zheng |
| 7,794,221 B2 | 9/2010 | Dubey |
| 7,829,488 B2 | 11/2010 | Bennett |
| 7,833,638 B2 | 11/2010 | Zheng et al. |
| 7,842,629 B2 | 11/2010 | Jaffee |
| 7,846,278 B2 | 12/2010 | Porter |
| 7,846,536 B2 | 12/2010 | Dubey |
| 7,879,144 B2 | 2/2011 | Hemmings et al. |
| 8,030,377 B2 | 10/2011 | Dubey et al. |
| 8,038,790 B1 | 10/2011 | Dubey et al. |
| 8,039,774 B2 | 10/2011 | Dubey |
| 8,061,257 B2 | 11/2011 | Tonyan et al. |
| 8,062,741 B2 | 11/2011 | Tonyan et al. |
| 8,070,878 B2 | 12/2011 | Dubey |
| 8,070,895 B2 | 12/2011 | Engbrecht et al. |
| 8,088,218 B2 | 1/2012 | Blackburn et al. |
| 8,137,490 B2 | 3/2012 | Frank et al. |
| 8,298,332 B2 | 10/2012 | Dubey et al. |
| 8,618,445 B2 | 12/2013 | Dubey et al. |
| 8,663,382 B2 | 3/2014 | Dubey et al. |
| 2002/0045074 A1 | 4/2002 | Yu et al. |
| 2002/0095893 A1 | 7/2002 | Walters et al. |
| 2002/0155282 A1* | 10/2002 | Randall .............. E04C 2/043 428/341 |
| 2002/0170648 A1 | 11/2002 | Dinkel |
| 2003/0031854 A1 | 2/2003 | Kajander et al. |
| 2003/0129903 A1 | 7/2003 | Moes |
| 2003/0175478 A1 | 9/2003 | Leclercq |
| 2004/0033749 A1 | 2/2004 | Smith et al. |
| 2004/0040474 A1 | 3/2004 | Perez-Pena et al. |
| 2004/0084127 A1 | 5/2004 | Porter |
| 2004/0142618 A1 | 7/2004 | Porter |
| 2004/0209074 A1 | 10/2004 | Randall et al. |
| 2004/0231916 A1 | 11/2004 | Englert et al. |
| 2004/0266303 A1 | 12/2004 | Jaffee |
| 2004/0266304 A1 | 12/2004 | Jaffee |
| 2005/0019618 A1 | 1/2005 | Yu et al. |
| 2005/0061237 A1 | 3/2005 | Dubey et al. |
| 2005/0064164 A1 | 3/2005 | Dubey et al. |
| 2005/0070186 A1 | 3/2005 | Shoemake et al. |
| 2005/0121131 A1 | 6/2005 | Hennis et al. |
| 2005/0142348 A1 | 6/2005 | Kajander et al. |
| 2005/0181693 A1 | 8/2005 | Kajander |
| 2005/0202227 A1 | 9/2005 | Kajander |
| 2005/0202742 A1 | 9/2005 | Smith et al. |
| 2005/0221705 A1 | 10/2005 | Hitch |
| 2005/0233657 A1 | 10/2005 | Grove et al. |
| 2005/0238863 A1 | 10/2005 | Swales et al. |
| 2005/0266225 A1 | 12/2005 | Currier et al. |
| 2006/0035112 A1 | 2/2006 | Veeramasuneni et al. |
| 2006/0054059 A1 | 3/2006 | Dubey et al. |
| 2006/0054060 A1 | 3/2006 | Dubey |
| 2006/0065342 A1 | 3/2006 | Porter |
| 2006/0068186 A1 | 3/2006 | Leclercq et al. |
| 2006/0134371 A1 | 6/2006 | Dubey |
| 2006/0147681 A1 | 7/2006 | Dubey |
| 2006/0188674 A1 | 8/2006 | Fernette et al. |
| 2006/0217017 A1 | 9/2006 | Tavy et al. |
| 2006/0240236 A1 | 10/2006 | Bland et al. |
| 2006/0252328 A1 | 11/2006 | Bingenheimer |
| 2007/0022913 A1 | 2/2007 | Wang et al. |
| 2007/0042657 A1 | 2/2007 | Bush et al. |
| 2007/0093159 A1 | 4/2007 | Kajander |
| 2007/0110970 A1 | 5/2007 | Dubey |
| 2007/0149078 A1 | 6/2007 | Nandi et al. |
| 2007/0149083 A1 | 6/2007 | Agrawal |
| 2007/0173574 A1* | 7/2007 | Weitzel et al. .............. 524/160 |
| 2007/0197114 A1 | 8/2007 | Grove et al. |
| 2008/0057318 A1 | 3/2008 | Adzima et al. |
| 2008/0060299 A1 | 3/2008 | Dubey et al. |
| 2008/0066650 A1 | 3/2008 | Dubey |
| 2008/0101150 A1 | 5/2008 | George et al. |
| 2008/0118735 A1 | 5/2008 | Kanao |
| 2008/0152945 A1 | 6/2008 | Miller et al. |
| 2008/0190062 A1 | 8/2008 | Engbrecht et al. |
| 2008/0241295 A1 | 10/2008 | Dubey |
| 2008/0261041 A1 | 10/2008 | Thomas et al. |
| 2008/0302276 A1 | 12/2008 | Perez-Pena et al. |
| 2009/0011207 A1 | 1/2009 | Dubey |
| 2009/0011212 A1 | 1/2009 | Dubey et al. |
| 2009/0029141 A1 | 1/2009 | Shake et al. |
| 2009/0075541 A1 | 3/2009 | Zheng et al. |
| 2009/0084514 A1 | 4/2009 | Smith et al. |
| 2009/0085253 A1 | 4/2009 | Kruss |
| 2009/0087616 A1 | 4/2009 | Hennis et al. |
| 2009/0124151 A1 | 5/2009 | Shoemake |
| 2009/0124161 A1 | 5/2009 | Shoemake |
| 2009/0155603 A1 | 6/2009 | Zheng et al. |

(56) References Cited

U.S. PATENT DOCUMENTS

| | | |
|---|---|---|
| 2009/0173423 A1 | 7/2009 | Jaffee |
| 2009/0186549 A1 | 7/2009 | Bennett |
| 2009/0202716 A1 | 8/2009 | Grove et al. |
| 2009/0208704 A1 | 8/2009 | Diwanji et al. |
| 2009/0208714 A1 | 8/2009 | Currier et al. |
| 2009/0223618 A1 | 9/2009 | Smith |
| 2009/0239977 A1 | 9/2009 | Dubey et al. |
| 2009/0275250 A1 | 11/2009 | Smith et al. |
| 2009/0297865 A1 | 12/2009 | Hauber et al. |
| 2010/0048080 A1 | 2/2010 | Bland et al. |
| 2010/0055439 A1 | 3/2010 | Lee et al. |
| 2010/0062264 A1 | 3/2010 | Hayes et al. |
| 2010/0065542 A1 | 3/2010 | Dubey |
| 2010/0065543 A1 | 3/2010 | Dubey et al. |
| 2010/0055431 A1 | 4/2010 | College |
| 2010/0087114 A1 | 4/2010 | Bush et al. |
| 2010/0143682 A1 | 6/2010 | Shake et al. |
| 2010/0229714 A1 | 9/2010 | Tonyan et al. |
| 2010/0229715 A1 | 9/2010 | Tonyan et al. |
| 2010/0230035 A1 | 9/2010 | Frank et al. |
| 2010/0247937 A1 | 9/2010 | Liu et al. |
| 2011/0166256 A1 | 7/2011 | Gallez et al. |
| 2011/0195241 A1 | 8/2011 | Yu et al. |
| 2011/0196070 A1 | 8/2011 | Keller et al. |
| 2011/0203487 A1 | 8/2011 | Thomas et al. |
| 2011/0296794 A1 | 12/2011 | Thomas et al. |
| 2012/0024196 A1* | 2/2012 | Gong et al. .............. 106/694 |
| 2012/0040165 A1 | 2/2012 | Dubey |
| 2012/0100295 A1 | 4/2012 | Dubey |
| 2012/0148806 A1 | 6/2012 | Dubey et al. |
| 2013/0284069 A1 | 10/2013 | Dubey |
| 2013/0284070 A1 | 10/2013 | Dubey |

FOREIGN PATENT DOCUMENTS

| | | |
|---|---|---|
| WO | WO 2010/036505 A2 | 4/2010 |
| WO | WO 2010051364 A1 | 5/2010 |
| WO | WO 2011103595 A1 | 8/2011 |
| WO | WO 2012047314 A1 | 4/2012 |

* cited by examiner

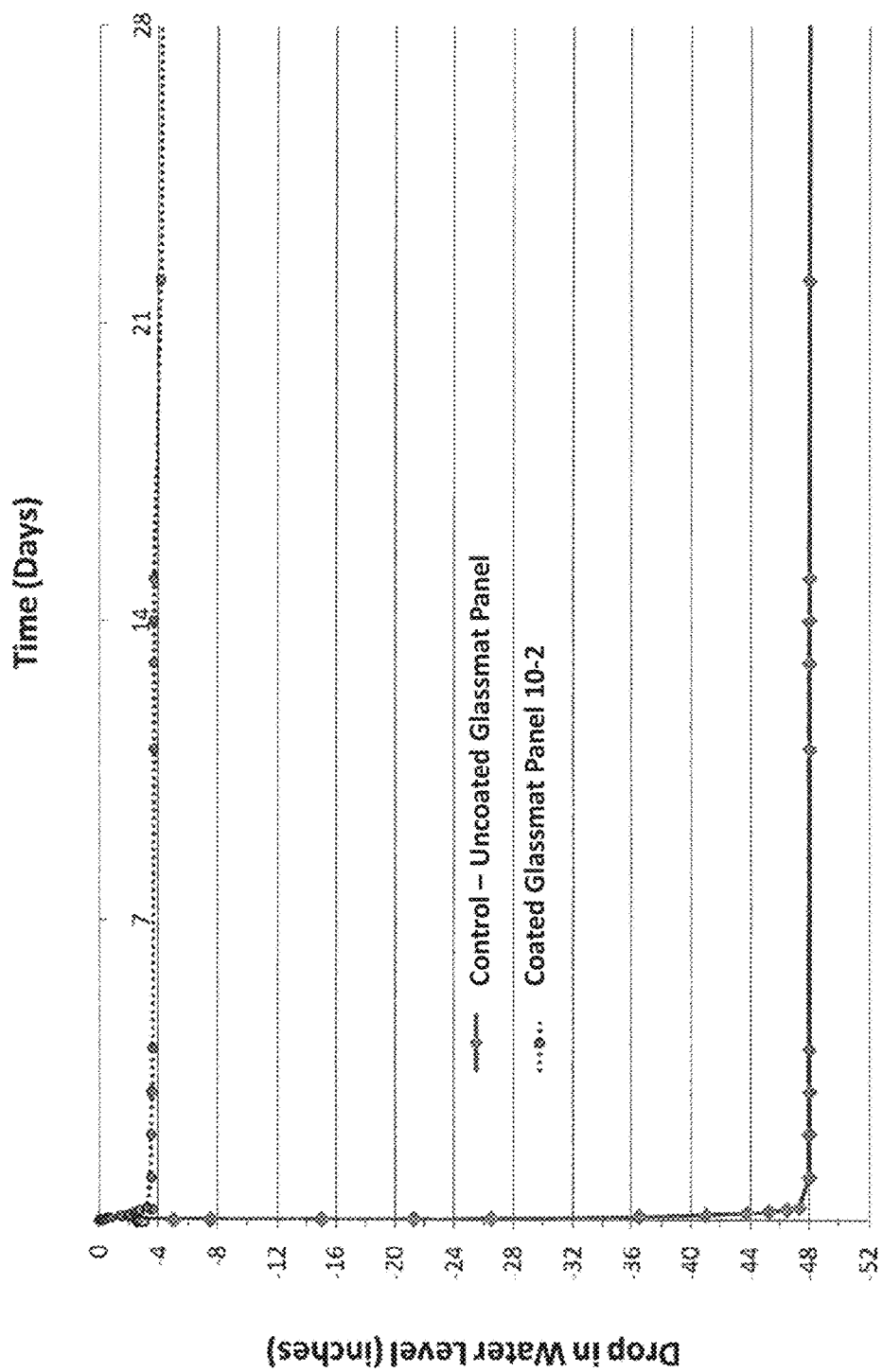

CEMENTITIOUS ARTICLE COMPRISING HYDROPHOBIC FINISH

BACKGROUND OF THE INVENTION

Cementitious articles, such as gypsum board and cement board, are useful in a variety of applications, some of which require a degree of water resistance. Traditional paper-faced cementitious articles do not always perform well under high moisture conditions, or upon exposure to the outdoors. Thus, for such applications, it is often desirable to use a cementitious article that is faced with a glass or polymer-based fiber mat instead of paper. It also is advantageous to use additives in the cementitious core that improve the water resistance of the core material itself.

The manufacturing process of cementitious articles, such as gypsum board and cement board, typically involves depositing a cementitious slurry over a first facing material and covering the wet slurry with a second facing material of the same type, such that the cementitious slurry is sandwiched between the two facing materials. Thereafter, excess water is removed from the slurry by drying. The cementitious slurry is allowed to harden to produce a solid article prior to final drying.

The manufacturing process of cementitious articles, thus, often requires the facing material to be sufficiently permeable that excess water can be removed from the cementitious slurry in the drying process. A drawback is that the permeability of the fibrous mat facing material also reduces the water-resistance of the cementitious article because it allows water to penetrate the mat and contact the cementitious core during use.

Thus, there remains a desire for new water resistant cementitious articles, as well as methods of preparing such articles.

BRIEF SUMMARY OF THE INVENTION

In one aspect, the invention provides a mat-faced gypsum board comprising, consisting of, or consisting essentially of gypsum-based core, fibrous mat, and hydrophobic finish. The fibrous mat has an inner surface facing at least one face of the gypsum-based core and an outer surface opposite the inner surface. The hydrophobic finish faces the outer surface of the mat. The hydrophobic finish comprises Class C fly ash, film-forming polymer, and silane compound, of the chemical formula:

$$(RO)_3-Si-X,$$

where RO is an alkoxy group and X is an organofunctional group. The hydrophobic finish faces an outer face of the mat, opposite the inner face that faces the board core. In some embodiments, the mat has two parts, with a mat on either side of the gypsum-based core, to form a sandwich structure.

In another aspect, the invention provides a mat-faced gypsum board comprising, consisting of, or consisting essentially of gypsum-based core. The hydrophobic finish comprises Class C fly ash, film-forming polymer, and silane compound having a molecular weight of at least about 150 Daltons (e.g., at least about 175, at least about 200, or at least about 250). The hydrophobic finish faces an outer face of the mat, opposite the inner face that faces the board core. In some embodiments, the mat has two parts, with a mat on either side of the gypsum-based core, to form a sandwich structure.

In another aspect, the invention provides a mat-faced gypsum board comprising, consisting of, or consisting essentially of cementitious core, fibrous mat comprising polymer or mineral fiber, and hydrophobic finish consisting essentially of Class C fly ash, film-forming polymer, and alkyl alkoxysilane. The finish composition can be applied in a wet state in some embodiments. The Class C fly ash can be present in an amount from about 50% to about 85% by weight of the wet finish composition. The film-forming polymer can be in the form of one or more of the following polymers: acrylic polymers and copolymers, rubber-based polymers and copolymers such as styrene-butadiene rubber, copolymers of styrene and acrylic, copolymers of vinyl acetate and ethylene, copolymers of vinyl chloride and ethylene, copolymers of vinyl acetate and VeoVa (vinyl ester of versatic acid), copolymers of vinyl laurate and ethylene, terpolymers of vinyl acetate, ethylene and methylmethaacrylate, terpolymers of vinyl acetate, ethylene and vinyl laurate, terpolymers of vinyl acetate, ethylene and VeoVa (vinyl ester of versatic acid), and any combination thereof. The film-forming polymer can be in an amount from about 5% to about 25% by weight of the wet finish. The alkyl alkoxysilane can be in an amount of about 0.1% to about 5% by weight of the wet finish. The fibrous mat has an inner surface facing at least one face of the gypsum-based core. The hydrophobic finish faces an outer face of the mat, opposite the inner face that faces the board core. In some embodiments, the mat has two parts, with a mat on either side of the gypsum-based core, to form a sandwich structure.

In another aspect, the invention provides an article comprising cementitious core material, and a finish composition facing the cementitious core, wherein the finish composition comprises Class C fly ash, film-forming polymer, and silane compound of the general formula:

$$(RO)_3-Si-X,$$

where RO is an alkoxy group and X is an organofunctional group.

Advantageously, product (e.g., cementitious panels or articles) according to embodiments of the invention exhibit one or more superior properties, such as water penetration resistance and/or impermeability; water durability and erosion resistance; bond with a variety of finishes, adhesives, and cementitious mortars; lower surface absorption resulting in significant reduction in usage of externally applied finishes and adhesives; aesthetics; and/or mold and mildew resistance.

BRIEF DESCRIPTION OF THE SEVERAL VIEWS OF THE DRAWINGS

FIG. 5A is a graph of drop in water level (inches) versus time (days), which illustrates water penetration resistance testing for finished glass mat reinforced gypsum panel of Sample D set forth in Example 5.

DETAILED DESCRIPTION OF THE INVENTION

Figure 1A:
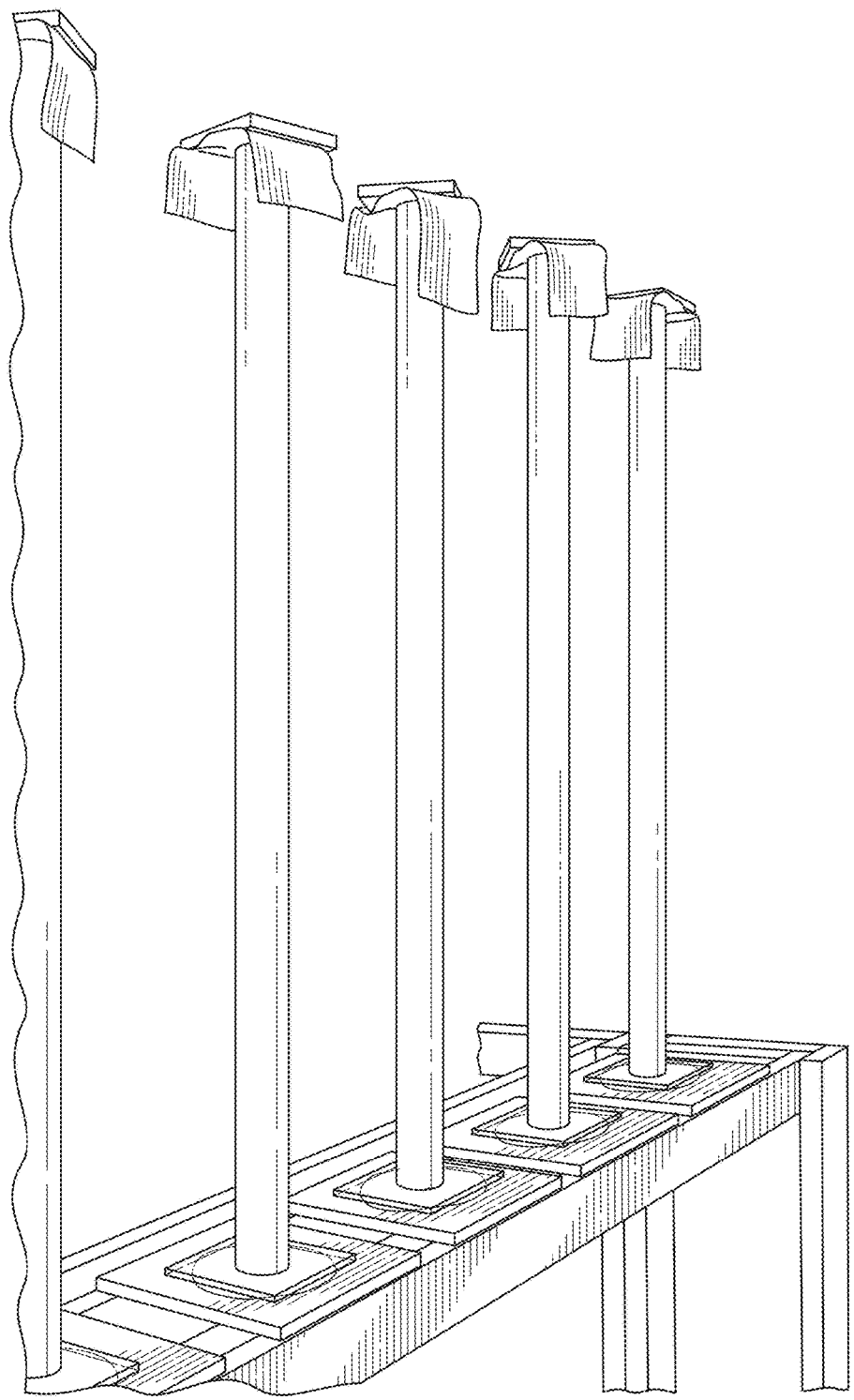
FIG. 1A illustrates equipment in a water penetration testing arrangement as described in Example 1.

The present invention is directed, at least in part, to improving water resistance in cementitious product, such as mat-faced board. Product according to the invention comprises, consists of, or consists essentially of cementitious core and hydrophobic finish facing the core. The hydrophobic finish comprises, consists of, or consists essentially of Class C fly ash, film-forming polymer, and silane compound.

In some embodiments, product is board that comprises, consists of, or consists essentially of cementitious core (e.g., gypsum-based core), fibrous mat, and hydrophobic finish that faces an outer surface of the mat, where the mat has an inner surface that can face a gypsum core, and the outer surface is opposite the inner face. The term "faces," as used herein, means that other components may optionally be between the finish and mat, or between the mat and core, in accordance with embodiments of the invention (as defined herein). In some embodiments, the mat can be in at least two parts, with, for example, a mat on either side of the gypsum-based core to form a sandwich arrangement as known in the art. In embodiments where the mat has more than one part, at least one mat, and in some embodiments, all mats, have hydrophobic finish facing the respective outer surfaces of the mat(s).

Surprisingly, embodiments of the present invention impart an improved water resistance, such as for mat-faced applications, and in some embodiments, the product of the invention can achieve substantial impermeability to water to allow for water barrier properties. In some embodiments, board according to the invention passes the waterproofness standard according to ANSI A118 (as it refers to ASTM D4068). Passing the waterproofness standard advantageously can allow product in accordance with embodiments of the invention to be used in areas subject to waterproof standards under international building and residential codes.

Furthermore, product according to the invention achieves the water resistance and/or water barrier properties without compromising strength or flexibility of the product. Thus, product according to embodiments of the invention does not become too rigid or brittle, but rather achieves desirable mechanical properties such as nail-pull resistance, flexural strength, core hardness, end and edge hardness, surface water absorption, and/or humidified deflection in accordance with ASTM C1178. In addition, the shear bond strength of the panels of the invention (e.g., when bonded using set cement mortar or organic adhesive) exceeds about 50 psi when tested in accordance to the ASTM C1325 standard. This property is useful in some embodiments that can be used as substrates to bond ceramic tiles and stones using thin set cement mortars or organic adhesives.

Embodiments of the finish composition according to the invention further exhibit surprising flexibility. The flexible nature of the cementitious finish composition is particularly useful in some embodiments in resisting formation of cracks and mechanical deterioration due to various factors during the life cycle of the product and possibly the building or structure containing the product. These factors include, for example, flexing of the panel during handling or installation; flexing and deformation of the panel due to externally applied loads; scratching of the panel from construction equipment and tools such as mortar trowels, etc.; material shrinkage or expansion due to hygrothermal changes; water erosion; vapor pressure; and freezing and thawing environmental cycling.

It is further surprising and unexpected that product according to some embodiments of the invention achieve the desired features (e.g., anti-water penetration, water impermeability, strength, and/or flexibility) without requiring finish composition of substantial thickness and/or without requiring significant quantities of Class C fly ash, silane, or film-forming polymer, as described herein, due to the surprising and unexpected synergy of the ingredients in the finish composition.

Embodiments of board according to the present invention can be used in a number of interior and exterior applications, particularly where water resistance and especially waterproofness would be beneficial. For example, board in accordance with the invention can be used as backerboard, such as might be useful in the installation of ceramic tiles and natural stone in wet and dry areas of buildings or other structures. Non-limiting examples of tile backer applications would include wet areas of buildings or other structures, such as in kitchens and bathrooms, including shower stalls, backsplashes, countertops, floors, and the like.

Board according to embodiments of the invention can also be used for exterior weather barrier panels, such as for exterior sheathing. In this respect, the board can be used as an exterior sheathing panel to provide an integrated weather barrier. In other embodiments, board according to the invention can be used as a roof cover board having desirable water durability and low surface absorption properties for this application. Such low absorption may be useful to reduce usage of, for example, externally applied finishings and adhesives. In still other embodiments, board according to the invention can be used as exterior wall substrates. Such exterior wall substrates may be useful in a number of ways, such as for installation of a variety of component and finish materials, such as foam plastics, cementitious base finishes and the like, in exterior insulation finish systems (EIFS), and direct-applied exterior finish systems (DEFS), as known in the art. In one aspect, the board is useful under exterior claddings.

In the finish composition, hydraulic component comprising Class C hydraulic fly ash, or its equivalent is included. The hydraulic component can comprise, consist of, or consist essentially of the Class C fly ash. This type of fly ash is a high lime content fly ash that can be obtained, e.g., from the processing of certain coals. For example, in some embodiments, the Class C fly ash has a lime content of at least about 10%, such as at least about 12%, at least about 15%, at least about 18% or at least about 20% by weight of the fly ash. ASTM designation C-618 describes the characteristics of Class C fly ash (e.g., Bayou Ash Inc., Big Cajun, II, La.). When mixed with water, the fly ash sets similarly to a cement or gypsum. In some embodiments, the finish composition comprises Class C fly ash and is substantially free of any other hydraulic material. As used herein, "substantially free" of such other hydraulic material means that the composition contains 0 wt. % based on the weight of the composition, or no such other hydraulic material, or an ineffective or immaterial amount of such other hydraulic material. An example of an ineffective amount is an amount below the threshold amount to achieve the intended purpose of using such setting material, as one of ordinary skill in the art will appreciate. An immaterial amount may be, e.g., about 10% or less, about 5% or less, about 2% or less, about 1% or less, about 0.5% or less, or about 0.1% or less, based on the weight of the composition, depending on the ingredient, as one of ordinary skill in the art will appreciate.

However, in other embodiments, use of other hydraulic components in combination with fly ash are contemplated, including cements, including high alumina cements, calcium sulfates, including calcium sulfate anhydrite, calcium sulfate hemihydrates or calcium sulfate dihydrate, other hydraulic components and combinations thereof. Mixtures of fly ashes are also contemplated for use. Silica fume (e.g., SKW Silicium Becancour, St. Laurent, Quebec, Calif.) is another preferred material.

When Portland cement, quick lime (CaO) or hydrated lime ($Ca(OH)_2$) are included in the hydraulic component, they may produce heat and impact rheology such that the finish composition may be adversely affected such as in the form of cracking or other damage. Accordingly, in some embodiments, Portland cement is included in the hydraulic component in an amount of about 50% or less by weight of the hydraulic component, such as about 45% or less, about 40% or less, about 35% or less, about 30% or less, about 25% or less, about 20% or less, about 15% or less, about 10% or less, about 5% or less, about 1% or less, or about 0.1% or less. In the case of quick lime, if included, in some embodiments, it is included in an amount of about 10% or less by weight of the hydraulic component, such as about 8% or less, about 5% or less, about 3% or less, about 1% or less, about 0.5% or less, or about 0.1% or less. With respect to hydrated lime, if included, in some embodiments, it is included in an amount of about 25% or less by weight of the hydraulic component, such as about 20% or less, about 15% or less, about 10% or less, about 5% or less, about 1% or less, about 0.5% or less, or about 0.1% or less.

While not wishing to be bound by theory, it is believed that the shape of the Class C fly ash particle contributes significantly to the characteristics of this composition. The spherical shape of fly ash creates a "ball bearing" effect in the mix, improving workability of the composition without increasing water requirements. In addition, some fly ashes have been shown to significantly decrease heat generation as the concrete hardens and strengthens. Class C fly ash, as do all pozzolanic materials, generally provides increased strength gain for much longer periods than mixes with Portland cement (e.g., St. Mary's Cement Inc., Detroit, Mich.) only. In the set product, there appears to be a larger proportion of amorphous material than is found in gypsum or concrete, allowing more flex in the material.

Another reason Class C fly ash is desired is the increased life cycle expectancy and increase in durability associated with its use. During the hydration process, fly ash chemically reacts with the calcium hydroxide forming calcium silicate hydrates and calcium aluminate hydrates, which reduces the risk of leaching calcium hydroxide, making the composition less permeable. Class C fly ash also improves the permeability of hydraulic compositions by lowering the water-to-cement ratio, which reduces the volume of capillary pores remaining in the set composition. The spherical shape of fly ash improves the consolidation of the composition, which also reduces permeability. It is also theorized that tricalcium aluminate, which is frequently present in fly ash, acts as a set accelerator to speed up the setting reactions.

In some embodiments, the Class C fly ash has a mean particle size from about 1 micron to about 100 microns. In embodiments of the invention, the mean particle size of the fly ash, can be, for example, as listed in Table 1 below. In the table, an "X" represents the range "from about [corresponding value in first row] to about [corresponding value in first column]." The indicated values represent mean particle size in microns. For ease of presentation, it will be understood that each value represents "about" that value. For example, the first "X" is the range "from about 1 micron to about 10 microns."

TABLE 1

|     | 1 | 10 | 20 | 30 | 40 | 50 | 60 | 70 | 80 | 90 |
|-----|---|----|----|----|----|----|----|----|----|----|
| 10  | X |    |    |    |    |    |    |    |    |    |
| 20  | X | X  |    |    |    |    |    |    |    |    |
| 30  | X | X  | X  |    |    |    |    |    |    |    |
| 40  | X | X  | X  | X  |    |    |    |    |    |    |
| 50  | X | X  | X  | X  | X  |    |    |    |    |    |
| 60  | X | X  | X  | X  | X  | X  |    |    |    |    |
| 70  | X | X  | X  | X  | X  | X  | X  |    |    |    |
| 80  | X | X  | X  | X  | X  | X  | X  | X  |    |    |
| 90  | X | X  | X  | X  | X  | X  | X  | X  | X  |    |
| 100 | X | X  | X  | X  | X  | X  | X  | X  | X  | X  |

Thus, the mean particle size can have a range between and including any of the aforementioned endpoints.

In some embodiments, the hydraulic component is substantially free of silica ($SiO_2$), alumina ($Al_2O_3$) or iron oxide ($Fe_2O_3$). As used herein, "substantially free" of silica, alumina or iron oxide means that the composition contains 0 wt. % based on the weight of the composition, or no silica, alumina or iron oxide, or an ineffective or immaterial amount of silica, alumina or iron oxide. An example of an ineffective amount is an amount below the threshold amount to achieve the intended purpose of using such setting material, as one of ordinary skill in the art will appreciate. An immaterial amount may be, e.g., about 5% or less, about 2% or less, about 1% or less, or about 0.1% or less, based on the weight of the composition, depending on the ingredient, as one of ordinary skill in the art will appreciate.

However, if desired in some embodiments, silica, alumina, and/or iron oxide can be included. If included, in some embodiments, these materials in total account for less than about 50% by weight of the hydraulic component, such as for example, less than about 40%, less than about 30%, less than about 20%, or less than about 10% by weight of the hydraulic component.

The amount of the hydraulic component (e.g., Class C fly ash alone or in some combination with other hydraulic material) in some embodiments can be from about 50% to about 85% by weight of the wet finish composition. In embodiments of the invention, the amount of the hydraulic component, e.g., Class C fly ash, can be, for example, as listed in Table 2 below. In the table, an "X" represents the range "from about [corresponding value in first row] to about [corresponding value in first column]." The indicated values represent percentage by weight of the wet finish composition. For ease of presentation, it will be understood that each value represents "about" that value. For example, the first "X" is the range "from about 50% by weight of the wet finish composition to about 55% by weight of the composition."

TABLE 2

|    | 50 | 55 | 60 | 65 | 70 | 75 | 80 |
|----|----|----|----|----|----|----|----|
| 55 | X  |    |    |    |    |    |    |
| 60 | X  | X  |    |    |    |    |    |
| 65 | X  | X  | X  |    |    |    |    |
| 70 | X  | X  | X  | X  |    |    |    |
| 75 | X  | X  | X  | X  | X  |    |    |
| 80 | X  | X  | X  | X  | X  | X  |    |
| 85 | X  | X  | X  | X  | X  | X  | X  |

Thus, the amount of the Class C fly ash can have a range between and including any of the aforementioned endpoints.

Film-forming polymer is included in embodiments of the finish composition. The film-forming polymer is preferably made from a pure acrylic, a rubber, a styrene butadiene rubber, a styrene acrylic, a vinyl acrylic, or an acrylated ethylene vinyl acetate copolymer. Preferably film-forming polymer is derived from at least one acrylic monomer selected from the group consisting of acrylic acid, acrylic acid esters, methacrylic acid, and methacrylic acid esters. For example, the monomers preferably employed in emulsion polymerization include methyl acrylate, methyl methacrylate, ethyl acrylate, ethyl methacrylate, butyl acrylate, butyl methacrylate, propyl acrylate, propyl methylacrylate, 2-ethyl hexyl acrylate and methacrylate, cyclohexyl acrylate and methacrylate, decyl-acrylate and methacrylate, isodecylacrylate and methacrylate, benzyl acrylate and methacrylate, other acrylates, methacrylates and their blends, acrylic acid, methacrylic acid, styrene, vinyl toluene, vinyl acetate, vinyl esters of higher carboxylic acids than acetic acid, for example, vinyl versatate, acrylonitrile, acrylamide, butadiene, ethylene, vinyl chloride and the like, and mixtures thereof. In some embodiments, the film-forming polymer comprises one or more of the following: acrylic polymers and copolymers, rubber-based polymers and copolymers such as styrene-butadiene rubber, copolymers of styrene and acrylic, copolymers of vinyl acetate and ethylene, copolymers of vinyl chloride and ethylene, copolymers of vinyl acetate and VeoVa (vinyl ester of versatic acid), copolymers of vinyl laurate and ethylene, terpolymers of vinyl acetate, ethylene and methylmethaacrylate, terpolymers of vinyl acetate, ethylene and vinyl laurate, terpolymers of vinyl acetate, ethylene and VeoVa (vinyl ester of versatic acid), and any combination thereof. In some embodiments, the film-forming polymer is water-soluble such as, for example, a latex polymer. The polymer can be used in either liquid form or as a re-dispersible polymer. One example is a copolymer of methyl methacrylate and butyl acrylate (e.g., Forton VF 774, EPS Inc., Marengo, Ill.).

The film-forming polymer can be present in some embodiments in an amount from about 5% to about 25% by weight of the wet finish composition. In embodiments of the invention, the amount of the film-forming polymer can be, e.g., as listed in Table 3 below. In the table, an "X" represents the range "from about [corresponding value in first row] to about [corresponding value in first column]." The indicated values represent percentage by weight of the wet finish composition. For ease of presentation, it will be understood that each value represents "about" that value. For example, the first "X" is the range "from about 5% by weight of the wet finish composition to about 8% by weight of the wet finish composition."

TABLE 3

|    | 5 | 8 | 10 | 12 | 15 | 18 | 20 | 22 |
|----|---|---|----|----|----|----|----|----|
| 8  | X |   |    |    |    |    |    |    |
| 10 | X | X |    |    |    |    |    |    |
| 12 | X | X | X  |    |    |    |    |    |
| 15 | X | X | X  | X  |    |    |    |    |
| 18 | X | X | X  | X  | X  |    |    |    |
| 20 | X | X | X  | X  | X  | X  |    |    |
| 22 | X | X | X  | X  | X  | X  | X  |    |
| 25 | X | X | X  | X  | X  | X  | X  | X  |

Thus, the amount of the film-forming polymer can have a range between and including any of the aforementioned endpoints.

Silane compound is included in the finish composition in accordance with the present invention. In some embodiments, the silane is within the general chemical formula:

$(RO)_3-Si-X$, where RO is an alkoxy group and X is an organofunctional group. With respect to the RO alkoxy group, in some embodiments, it can be methoxy or ethoxy, although other alkoxy groups are contemplated and can be included. The X organofunctional group can be any such hydrophobicity providing group, such as, for example, methyl, ethyl, propyl, butyl, pentyl, hexyl or octyl. Long-chain organofunctional groups such as butyl, pentyl, hexyl and octyl groups are selected in some embodiments of the invention for their beneficial role in providing enhanced hydrophobicity.

While not being bound by any theory, it is believed that silane compounds with long-chain organofunctional groups are relatively more stable in the finish composition of embodiments of the present invention and therefore provide superior water repellency characteristics. Silanes crosslink or bond to inorganic surfaces through elimination of the alkoxy groups after hydrolysis and condensation reaction. The alkoxy groups react with themselves and any hydoxy (OH) groups within the substrate when moisture is present, forming a silicone resin network. This formation of strong chemical bonds provides long term durability such as might be characteristics of silicone treatments. However, in some embodiments, although generally less preferred, and excluded in some embodiments, it may be possible to utilize small-chain organofunctional groups such as methyl although their use may lead to less desirable hydrophobicity and anti-water penetration properties.

In some embodiments, silane compound (e.g., alkyl alkoxysilane) according to the invention is characterized by a molecular weight of at least about 150, such as at least about 175, at least about 200, at least about 225, or greater. The silane compound can be added to the mixture either in a concentrated form or in the form of an emulsion, as one of ordinary skill in the art will readily appreciate.

Some examples of suitable alkyl alkoxysilane compounds in accordance with embodiments of the invention include, for example, octyltriethoxy silane, isooctyltriethoxy silane, octyltrimethoxy silane, isooctyltrimethoxy silane, butyltriethoxy silane, isobutyltriethoxy silane, butyltrimethoxy silane, or isobutyltrimethoxy silane, or any combination thereof. In some embodiments, mixtures of silanes and siloxane compounds can also be utilized to provide the desired degree of water penetration resistance to the panels of the invention.

Silane compound can be present in accordance with embodiments of the invention in an amount of about 5% by weight or less of the wet finish composition, e.g., in an amount from about 0.1% to about 5% by weight. In embodiments of the invention, the amount of the silane compound can be, e.g., as listed in Table 4 below. In the table, an "X" represents the range "from about [corresponding value in first row] to about [corresponding value in first column]." The indicated values represent percentage by weight of the wet finish composition. For ease of presentation, it will be understood that each value represents "about" that value. For example, the first "X" is the range "from about 0.1% by weight of the wet finish composition to about 0.5% by weight of the wet finish composition."

TABLE 4

|     | 0.1 | 0.5 | 1 | 1.5 | 2 | 2.5 | 3 | 3.5 | 4 | 4.5 |
|-----|-----|-----|---|-----|---|-----|---|-----|---|-----|
| 0.5 | X   |     |   |     |   |     |   |     |   |     |
| 1   | X   | X   |   |     |   |     |   |     |   |     |
| 1.5 | X   | X   | X |     |   |     |   |     |   |     |
| 2   | X   | X   | X | X   |   |     |   |     |   |     |
| 2.5 | X   | X   | X | X   | X |     |   |     |   |     |
| 3   | X   | X   | X | X   | X | X   |   |     |   |     |
| 3.5 | X   | X   | X | X   | X | X   | X |     |   |     |
| 4   | X   | X   | X | X   | X | X   | X | X   |   |     |
| 4.5 | X   | X   | X | X   | X | X   | X | X   | X |     |
| 5   | X   | X   | X | X   | X | X   | X | X   | X | X   |

Thus, the amount of silane compound can have a range between and including any of the aforementioned endpoints.

One or more inorganic fillers and aggregates can optionally be included in the finish composition of some embodiments, e.g., to reduce cost and decrease shrinkage cracking. Typical fillers include sand, talc, mica, calcium carbonate, calcined clays, pumice, crushed or expanded perlite, volcanic ash, rice husk ash, diatomaceous earth, slag, metakaolin, and other pozzolanic materials. Amounts of these materials should not exceed the point where properties such as strength are adversely affected. For example, in some embodiments, the cumulative amount of aggregate or inorganic filler is about 50% or less by weight of the finish composition, such as, for example, about 45% or less, about 40% or less, about 35% or less, about 30% or less, about 25% or less, about 20% or less, about 15% or less, about 10% or less, about 5% or less, about 2% or less, about 1% or less, about 0.5% or less, or about 0.1% or less.

In some embodiments, such as when very thin finishes are being prepared, the use of very small fillers, such as sand or microspheres are preferred. If included, in some embodiments, the filler and/or aggregate preferably has a particle size of about 3000 microns or less, about 2500 microns or less, about 2000 microns or less, about 1500 microns or less, about 1000 microns or less, about 500 microns or less, or about 100 microns or less. While not wishing to be bound by any particular theory, it is believed that larger particle sizes can sometimes interfere with the process for finishing such that uniform coverage may be less apt to be achieved at times.

Water reducing admixture additives optionally can be included in embodiments of the finish composition, such as, for example, superplasticizer, to improve the fluidity of a hydraulic slurry. Such additives disperse the molecules in solution so that they move more easily relative to each other, thereby improving the flowability of the entire slurry. Polycarboxylates, sulfonated melamines and sulfonated naphthalenes are known as superplasticizers. Preferred superplasticizers include ADVA Cast and ADVA Cast 500 by Grace Construction Products, Cambridge, Mass. and Diloflo GW Superplasticizer of Geo Specialty Chemicals, Cedartown, Ga. The addition of these materials allows the user to tailor the fluidity of the slurry to the particular application.

Water reducing admixture additive can be present in an amount from about 0% to about 5% by weight of the wet finish composition. In embodiments of the invention, the water reducing admixture additive can be, e.g., as listed in Table 5 below. In the table, an "X" represents the range "from about [corresponding value in first row] to about [corresponding value in first column]." The indicated values represent percentage by weight of the wet finish composition. For ease of presentation, it will be understood that each value represents "about" that value. For example, the first "X" is the range "from about 0% to about 0.5% by weight of the wet finish composition."

TABLE 5

|     | 0 | 0.5 | 1 | 1.5 | 2 | 2.5 | 3 | 3.5 | 4 | 4.5 |
|-----|---|-----|---|-----|---|-----|---|-----|---|-----|
| 0.5 | X |     |   |     |   |     |   |     |   |     |
| 1   | X | X   |   |     |   |     |   |     |   |     |
| 1.5 | X | X   | X |     |   |     |   |     |   |     |
| 2   | X | X   | X | X   |   |     |   |     |   |     |
| 2.5 | X | X   | X | X   | X |     |   |     |   |     |
| 3   | X | X   | X | X   | X | X   |   |     |   |     |
| 3.5 | X | X   | X | X   | X | X   | X |     |   |     |
| 4   | X | X   | X | X   | X | X   | X | X   |   |     |
| 4.5 | X | X   | X | X   | X | X   | X | X   | X |     |
| 5   | X | X   | X | X   | X | X   | X | X   | X | X   |

Colorants optionally can be added to the finish composition to change the color of the composition or finished articles as desired. Fly ash is typically gray in color, with the Class C fly ash usually lighter than Class F fly ash. Any dyes or pigments that are compatible with the composition may be optionally used. Titanium dioxide is optionally used as a whitener. A preferred colorant is Ajack Black from Solution Dispersions, Cynthiana, Ky. Colorant can be present in an amount from about 0% to about 2% by weight of the wet finish composition, such as, for example, in an amount from about 0.1% to about 2% by weight of the wet finish composition, from about 0.5% to about 2% by weight of the wet finish composition, from about 1% to about 2% by weight of the wet finish composition, from about 0.1% to about 1.5% by weight of the wet finish composition, or about 0.5% to about 1.5% by weight of the wet finish composition.

The fibrous mat comprises any suitable type of polymer or mineral fiber, or combination thereof. Non-limiting examples of suitable fibers include glass fibers, polyamide fibers, polyaramide fibers, polypropylene fibers, polyester fibers (e.g., polyethylene teraphthalate (PET)), polyvinyl alcohol (PVOH), polyvinyl acetate (PVAc), cellulosic fibers (e.g., cotton, rayon, etc.), and the like, as well as combinations thereof. Furthermore, the fibers of the mat can be hydrophobic or hydrophilic, finished or unfinished. Of course, the choice of fibers will depend, in part, on the type of application in which the cementitious article is to be used. For example, when the cementitious article is used for applications that require heat or fire resistance, appropriate heat or fire resistant fibers should be used in the fibrous mat.

The fibrous mat can be woven or non-woven; however, non-woven mats are preferred. Non-woven mats comprise fibers bound together by a binder. The binder can be any binder typically used in the mat industry. Suitable binders include, without limitation, urea formaldehyde, melamine formaldehyde, stearated melamine formaldehyde, polyester, acrylics, polyvinyl acetate, urea formaldehyde or melamine formaldehyde modified or blended with polyvinyl acetate or acrylic, styrene acrylic polymers, and the like, as well as combinations thereof. Suitable fibrous mats include commercially available mats used as facing materials for cementitious articles.

By way of further illustration, a non-limiting example of a suitable glass fiber mat comprises about 80-90 percent (e.g., about 83 percent) 16 micron diameter, ½-inch to 1-inch long (about 1.2-2.5 cm long) continuous filament fibers and about 10-20 percent (e.g., about 17 percent) biosoluble microfibers having about 2.7 nominal micron diameter (Micro-Strand® Type 481, manufactured by Johns Manville) with a basis weight of about 24 lbs/1000 ft$^2$. One suitable glass fiber mat is the DuraGlass® 8924G Mat, manufactured by Johns Manville. The binder for the glass mat can be any suitable binder, for example, styrene acrylic binder, which can be about 28% (+/−3%) by weight of the mat. The glass mat can include a colored pigment, for example, green pigment or colorant.

The finish material can be applied to the fibrous mat as a liquid or solid material (e.g., resin, wet-dispersed powder, dry powder, or film) by any of various methods known in the art. For instance, the hydrophobic finish materials can be applied by brushing, spraying, rolling, pouring, dipping, sifting, or overlaying the hydrophobic finish material. Solid materials, such as powders, can be dispersed prior to application using any common solvent (e.g., water, alcohols, etc.) or dispersant, provided the solvent or dispersant does not react adversely with the fibrous mat materials. Solvents that etch the surface fibers of the fibrous mat, and thereby enhance the ability of the finish material to adhere to the mat, also can be used. Preferably, any solvent or dispersant used is easily dried and does not leave a residue that prevents the finish from adhering to the fibrous mat. Liquid or dispersed finish materials can have any viscosity suitable for application to the fibrous mat. Typically, the viscosity of a liquid or dispersed finish material will be from about 50-200 Kreb's units (KU) (about 300-20,000 cP), such as about 80-150 KU (about 800-8,000 cP).

Recognizing that the surface of the fibrous mat is an irregular surface, the finish material need not provide a finish that is completely continuous. When a liquid or powder finish composition is used, for instance, the finish material may fall within the voids between the fibers of the mat leaving gaps or holes in the finish. However, the finish material preferably is applied in an amount sufficient to provide a finish that is continuous and, desirably, coextensive with the dimensions of the first fibrous mat.

The hydrophobic finish applied to the first fibrous mat is preferably in the form of a layer. The layer, desirably, is thick enough to slow or prevent the penetration of cementitious slurry through the fibrous mat during production.

The finish desirably has a degree of hydrophobicity such that water applied to the finish surface exhibits a contact angle of about 30° or greater (e.g., about 40° or greater), such as about 30° to about 120°, or about 50° to about 100° The contact angle can be measured by any suitable technique.

The mat and finish together can form a composite of desired density and thickness. Advantageously, the finish in accordance with embodiments of the invention provides the aforesaid water resistance and aforesaid mechanical properties while using low amounts of finish and small thickness of finish, due to the surprising synergistic effect of the ingredients in the finish. For example, in some embodiments, the thickness of the finished fiber mat composite can be from about 0.0075 inches to about 0.040 inches, such as from about 0.0100 to about 0.030 inches, or from about 0.0125 to about 0.020 inches. In embodiments of the invention, the thickness of the finished fiber mat composite can be, e.g., as listed in Tables 6A and 6B below. In the tables, an "X" represents the range "from about [corresponding value in first row] to about [corresponding value in first column]." The indicated values represent thickness of the finished fiber mat composite in inches. For ease of presentation, it will be understood that each value represents "about" that value. For example, the first "X" in Table 6A is the range "0.0075 inches to about 0.0100 inches."

TABLE 6A

|        | 0.0075 | 0.01 | 0.0125 | 0.015 | 0.0175 | 0.02 |
|--------|--------|------|--------|-------|--------|------|
| 0.01   | X      |      |        |       |        |      |
| 0.0125 | X      | X    |        |       |        |      |
| 0.015  | X      | X    | X      |       |        |      |
| 0.0175 | X      | X    | X      | X     |        |      |
| 0.02   | X      | X    | X      | X     | X      |      |
| 0.0225 | X      | X    | X      | X     | X      | X    |
| 0.025  | X      | X    | X      | X     | X      | X    |
| 0.0275 | X      | X    | X      | X     | X      | X    |
| 0.03   | X      | X    | X      | X     | X      | X    |
| 0.0325 | X      | X    | X      | X     | X      | X    |
| 0.035  | X      | X    | X      | X     | X      | X    |
| 0.0375 | X      | X    | X      | X     | X      | X    |
| 0.04   | X      | X    | X      | X     | X      | X    |

TABLE 6B

|        | 0.0225 | 0.025 | 0.0275 | 0.03 | 0.0325 | 0.035 | 0.0375 |
|--------|--------|-------|--------|------|--------|-------|--------|
| 0.025  | X      |       |        |      |        |       |        |
| 0.0275 | X      | X     |        |      |        |       |        |
| 0.03   | X      | X     | X      |      |        |       |        |
| 0.0325 | X      | X     | X      | X    |        |       |        |
| 0.035  | X      | X     | X      | X    | X      |       |        |
| 0.0375 | X      | X     | X      | X    | X      | X     |        |
| 0.04   | X      | X     | X      | X    | X      | X     | X      |

Thus, the thickness of the finished fiber mat composite can have a range between and including any of the aforementioned endpoints set forth in Table 6A or 6B.

Because of the surprising and unexpected synergistic effect of the ingredients in the finish composition, the finish does not add considerable weight to product in embodiments of the invention. For example, with respect to density of the finished fiber mat composite, in some embodiments, it can be from about 65 pcf to about 125 pcf such as from about 75 pcf to about 115 pcf, or from about 80 pcf to about 120 pcf. In embodiments of the invention, the density of the finished fiber mat composite can be, e.g., as listed in Table 7 below. In the table, an "X" represents the range "from about [corresponding value in first row] to about [corresponding value in first column]." The indicated values represent density of the finished mat composite in lb/MSF. For ease of presentation, it will be understood that each value represents "about" that value. For example, the first "X" is the range "65 pcf to about 70 pcf."

TABLE 7

|     | 65 | 70 | 75 | 80 | 85 | 90 | 95 | 100 | 105 | 110 | 115 | 120 |
|-----|----|----|----|----|----|----|----|-----|-----|-----|-----|-----|
| 70  | X  |    |    |    |    |    |    |     |     |     |     |     |
| 75  | X  | X  |    |    |    |    |    |     |     |     |     |     |
| 80  | X  | X  | X  |    |    |    |    |     |     |     |     |     |
| 85  | X  | X  | X  | X  |    |    |    |     |     |     |     |     |
| 90  | X  | X  | X  | X  | X  |    |    |     |     |     |     |     |
| 95  | X  | X  | X  | X  | X  | X  |    |     |     |     |     |     |
| 100 | X  | X  | X  | X  | X  | X  | X  |     |     |     |     |     |
| 105 | X  | X  | X  | X  | X  | X  | X  | X   |     |     |     |     |
| 110 | X  | X  | X  | X  | X  | X  | X  | X   | X   |     |     |     |
| 115 | X  | X  | X  | X  | X  | X  | X  | X   | X   | X   |     |     |
| 120 | X  | X  | X  | X  | X  | X  | X  | X   | X   | X   | X   |     |
| 125 | X  | X  | X  | X  | X  | X  | X  | X   | X   | X   | X   | X   |

Thus, the density of the finished fiber mat composite can have a range between and including any of the aforementioned endpoints.

In some embodiments, the finish composition weight can be from about 40 lb/MSF to about 200 lb/MSF, such as from about 60 lb/MSF to about 160 lb/MSF, or from about 80 lb/MSF to about 120 lb/MSF. In embodiments of the invention, the finish weight can be, e.g., as listed in Table 8 below. In the table, an "X" represents the range "from about [corresponding value in first row] to about [corresponding value in first column]." The indicated values represent finish weight in lb/MSF. For ease of presentation, it will be understood that each value represents "about" that value. For example, the first "X" is the range "40 lb/MSF to about 50 lb/MSF."

TABLE 8

|     | 40 | 50 | 60 | 70 | 80 | 90 | 100 | 110 | 120 | 130 | 140 | 150 | 160 | 170 | 180 | 190 |
|-----|----|----|----|----|----|----|-----|-----|-----|-----|-----|-----|-----|-----|-----|-----|
| 50  | X  |    |    |    |    |    |     |     |     |     |     |     |     |     |     |     |
| 60  | X  | X  |    |    |    |    |     |     |     |     |     |     |     |     |     |     |
| 70  | X  | X  | X  |    |    |    |     |     |     |     |     |     |     |     |     |     |
| 80  | X  | X  | X  | X  |    |    |     |     |     |     |     |     |     |     |     |     |
| 90  | X  | X  | X  | X  | X  |    |     |     |     |     |     |     |     |     |     |     |
| 100 | X  | X  | X  | X  | X  | X  |     |     |     |     |     |     |     |     |     |     |
| 110 | X  | X  | X  | X  | X  | X  | X   |     |     |     |     |     |     |     |     |     |
| 120 | X  | X  | X  | X  | X  | X  | X   | X   |     |     |     |     |     |     |     |     |
| 130 | X  | X  | X  | X  | X  | X  | X   | X   | X   |     |     |     |     |     |     |     |
| 140 | X  | X  | X  | X  | X  | X  | X   | X   | X   | X   |     |     |     |     |     |     |
| 150 | X  | X  | X  | X  | X  | X  | X   | X   | X   | X   | X   |     |     |     |     |     |
| 160 | X  | X  | X  | X  | X  | X  | X   | X   | X   | X   | X   | X   |     |     |     |     |
| 170 | X  | X  | X  | X  | X  | X  | X   | X   | X   | X   | X   | X   | X   |     |     |     |
| 180 | X  | X  | X  | X  | X  | X  | X   | X   | X   | X   | X   | X   | X   | X   |     |     |
| 190 | X  | X  | X  | X  | X  | X  | X   | X   | X   | X   | X   | X   | X   | X   | X   |     |
| 200 | X  | X  | X  | X  | X  | X  | X   | X   | X   | X   | X   | X   | X   | X   | X   | X   |

Thus, the finish weight can have a range between and including any of the aforementioned endpoints.

Surprisingly, the finish composition is particularly efficient in promoting water resistance and/or water barrier, while achieving or maintaining mechanical properties, and without requiring significant amount of finish, in accordance with embodiments of the invention, because the finish substantially penetrates the mat. For example, in some embodiments, the finish penetration depth can be at least about 60% of fiber mat thickness, such as a penetration of at least about 70%, or at least about 80% of fiber mat thickness. In embodiments of the invention, the finish penetration depth can be, e.g., as listed in Table 9 below. In the table, an "X" represents the range "from about [corresponding value in first row] to about [corresponding value in first column]." The indicated values represent the percentage of the mat thickness that is penetrated. For ease of presentation, it will be understood that each value represents "about" that value. For example, the first "X" is the range "greater than about 60% of fiber mat thickness to an amount greater than about 65% of fiber mat thickness."

TABLE 9

|    | 60 | 65 | 70 | 75 | 80 | 85 |
|----|----|----|----|----|----|----|
| 65 | X  |    |    |    |    |    |
| 70 | X  | X  |    |    |    |    |
| 75 | X  | X  | X  |    |    |    |
| 80 | X  | X  | X  | X  |    |    |
| 85 | X  | X  | X  | X  | X  |    |
| 90 | X  | X  | X  | X  | X  | X  |

Thus, the finish penetration depth can have a range between and including any of the aforementioned endpoints.

Advantageously, in some embodiments, the finish sets and dries rapidly. Class C fly ash content in the finish is desirable in this regard. This advantage can be achieved in accordance with embodiments of the invention both under ambient conditions and at elevated temperature. For example, in some embodiments, the finish setting and drying time (under ambient condition of 75° F./50% RH) can be about 60 minutes or less (e.g., about 50 minutes or less, about 45 minutes or less, about 40 minutes or less, about 35 minutes or less, or about 30 minutes or less), such as about 30 minutes to about 60 minutes. In embodiments of the invention, the finish setting and drying time (under ambient condition—75° F./50% RH) can be, e.g., as listed in Table 10 below. In the table, an "X" represents the range "from about [corresponding value in first row] to about [corresponding value in first column]." The indicated values represent the number of minutes for the finish to set and dry. For ease of presentation, it will be understood that each value represents "about" that value. For example, the first "X" is the range "from about 30 minutes to about 35 minutes."

TABLE 10

|    | 30 | 35 | 40 | 45 | 50 | 55 |
|----|----|----|----|----|----|----|
| 35 | X  |    |    |    |    |    |
| 40 | X  | X  |    |    |    |    |
| 45 | X  | X  | X  |    |    |    |
| 50 | X  | X  | X  | X  |    |    |
| 55 | X  | X  | X  | X  | X  |    |
| 60 | X  | X  | X  | X  | X  | X  |

Thus, the finish setting and drying time (under ambient condition—75° F./50% RH) can have a range between and including any of the aforementioned endpoints.

In some embodiments, the finish setting and drying time at elevated temperature (about 175° F.) can be about 5 minutes or less (e.g., about 4 minutes or less, about 3 minutes or less, about 2 minutes or less, or about 1 minute or less), such as about 1 minute to about 5 minutes. In embodiments of the invention, the finish setting and drying time (at elevated temperature) can be, e.g., as listed in Table 11 below. In the table, an "X" represents the range "from about [corresponding value in first row] to about [corresponding value in first column]." The indicated values represent the number of minutes for the finish to set and dry. For ease of presentation, it will be understood that each value represents "about" that value. For example, the first "X" is the range "about 1 minute to about 1.5 minutes."

TABLE 11

|     | 1 | 1.5 | 2 | 2.5 | 3 | 3.5 | 4 | 4.5 |
|-----|---|-----|---|-----|---|-----|---|-----|
| 1.5 | X |     |   |     |   |     |   |     |
| 2   | X | X   |   |     |   |     |   |     |
| 2.5 | X | X   | X |     |   |     |   |     |
| 3   | X | X   | X | X   |   |     |   |     |
| 3.5 | X | X   | X | X   | X |     |   |     |
| 4   | X | X   | X | X   | X | X   |   |     |
| 4.5 | X | X   | X | X   | X | X   | X |     |
| 5   | X | X   | X | X   | X | X   | X | X   |

Thus, the finish setting and drying time (at elevated temperatures) can have a range between and including any of the aforementioned endpoints.

The cementitious core can comprise any material, substance, or composition containing or derived from hydraulic cement, along with any suitable additives. Non-limiting examples of materials that can be used in the cementitious core include Portland cement, sorrel cement, slag cement, fly ash cement, calcium alumina cement, water-soluble calcium sulfate anhydrite, calcium sulfate α-hemihydrate, calcium sulfate β-hemihydrate, natural, synthetic or chemically modified calcium sulfate hemihydrates, calcium sulfate dihydrate ("gypsum," "set gypsum," or "hydrated gypsum"), and mixtures thereof. As used herein, the term "calcium sulfate material" refers to any of the forms of calcium sulfate referenced above.

The additives can be any additives commonly used to produce cementitious articles, such as gypsum board or cement board. Such additives include, without limitation, structural additives such as mineral wool, continuous or chopped glass fibers (also referred to as fiberglass), perlite, clay, vermiculite, calcium carbonate, polyester, and paper fiber, as well as chemical additives such as foaming agents, fillers, accelerators, sugar, enhancing agents such as phosphates, phosphonates, borates and the like, retarders, binders (e.g., starch and latex), colorants, fungicides, biocides, and the like. Examples of the use of some of these and other additives are described, for instance, in U.S. Pat. Nos. 6,342,284, 6,632,550, 6,800,131, 5,643,510, 5,714,001, and 6,774,146, and U.S. Patent Publications 2004/0231916 A1, 2002/0045074 A1 and 2005/0019618 A1.

Preferably, the cementitious core comprises a calcium sulfate material, Portland cement, or mixture thereof. Advantageously, if desired, in some embodiments, the cementitious core also comprises a hydrophobic agent, such as a silicone-based material (e.g., a silane, siloxane, or silicone-resin matrix), in a suitable amount to improve the water resistance of the core material. It is also preferred that the cementitious core comprise a siloxane catalyst, such as magnesium oxide (e.g., dead burned magnesium oxide), fly ash (e.g., Class C fly ash), or a mixture thereof. The siloxane and siloxane catalyst can be added in any suitable amount, and by any suitable method as described herein with respect the method of preparing a water-resistant cementitious article of the invention, or as described, for example, in U.S. Patent Publications 2006/0035112 A1 or 2007/0022913 A1. Desirably, the cementitious core also comprises strength-improving additives, such as phosphates (e.g., polyphosphates as described in U.S. Pat. Nos. 6,342,284, 6,632,550, and 6,800,131 and U.S. Patent Publications 2002/0045074 A1, 2005/0019618 A1, and 2007/0022913 A1) and/or pre-blended unstable and stable soaps (e.g., as described in U.S. Pat. Nos. 5,683,635 and 5,643,510). The cementitious core can comprise paper or glass fibers, but is preferably substantially free of paper and/or glass fibers (e.g., comprises less than about 1 wt. %, less than about 0.5 wt. %, less than about 0.1 wt. %, or even less than about 0.05 wt. % of paper and/or glass fibers, or contains no such fibers). For the purposes herein, the core can include one or more dense skim coats and/or hard edges, as is known in the art.

The cementitious article can be any of any type or shape suitable for a desired application. Non-limiting examples of cementitious articles include gypsum panels and cement panels of any size and shape.

The cementitious article can be prepared, including application of finish to form a composite, by any suitable method including, but not limited to, the inventive methods described herein, and, e.g., as described in corresponding, commonly-assigned U.S. patent application Ser. No. 13/837,041, filed Mar. 15, 2013, entitled "Method of Preparing Mat-Faced Article," which is incorporated herein by reference. Embodiments of a method of preparing a fibrous mat-faced cementitious article according to the invention comprise (a) depositing a cementitious slurry on a first fibrous mat comprising polymer or mineral fibers, wherein the first fibrous mat comprises a hydrophobic finish on at least one surface thereof, and the cementitious slurry is deposited on the hydrophobic finish, and (b) allowing the cementitious slurry to harden, thereby providing a fibrous mat-faced cementitious article.

The method of preparing a cementitious article in accordance with the invention can be conducted on existing gypsum board manufacturing lines used to make fibrous mat-faced cementitious articles known in the art. Briefly, the process typically involves discharging a fibrous mat material onto a conveyor, or onto a forming table that rests on a conveyer, which is then positioned under the discharge conduit (e.g., a gate-canister-boot arrangement as known in the art, or an arrangement as described in U.S. Pat. Nos. 6,494,609 and 6,874,930) of a mixer. The components of the cementitious slurry are fed to the mixer comprising the discharge conduit, where they are agitated to form the cementitious slurry. Foam can be added in the discharge conduit (e.g., in the gate as described, for example, in U.S. Pat. Nos. 5,683,635 and 6,494,609). The cementitious slurry is discharged onto the fibrous mat facing material. The slurry is spread, as necessary, over the fibrous mat facing material and optionally covered with a second facing material, which may be a fibrous mat or other type of facing material (e.g., paper, foil, plastic, etc.). The wet cementitious assembly thereby provided is conveyed to a forming station where the article is sized to a desired thickness, and to one or more knife sections where it is cut to a desired length to provide a cementitious article. The cementitious article is allowed to harden, and, optionally, excess water is removed using a drying process (e.g., by air-drying or transporting the cementitious article through a kiln). Each of the above steps, as well as processes and equipment for performing such steps, are known in the art. It also is common in the manufacture of cementitious articles such as gypsum and cement board to deposit a relatively dense layer of slurry onto a facing material before depositing the primary slurry, and to use vibration in order to eliminate large voids or air pockets from the deposited slurry. Also, hard edges, as known in the art, are sometimes used. These steps or elements (dense slurry layer, vibration, and/or hard edges) optionally can be used in conjunction with the invention.

All aspects of the fibrous mat used in accordance with the method of preparing a cementitious article are as described herein with respect to the cementitious article of the invention.

Surprisingly, product according to some embodiments of the present invention pass the test for waterproofness under the American National Standards Institute (ANSI) standard ANSI A118.10 (revised, October 2008), which modifies ASTM D4068-01 (Annex 2: Hydrostatic Pressure Test). The waterproof test is conducted with a hydrostatic head of 24 inches on the sample. It is surprising and unexpected that product according to the invention not only exhibits desirable water resistance properties, but also in some embodiments exhibits waterproofness. As such, product according to embodiments of the invention is useful in applications where such water impermeability property is particularly desirable, as described herein.

Furthermore, it is surprising and unexpected that product according to some embodiments of the invention achieves desirable strength and flexibility properties in addition to the water resistance and/or waterproofness properties. To this end, product according to embodiments of the invention achieves water resistance and water impermeability without becoming undesirably too brittle or otherwise compromising strength.

Thus, in some embodiments, product according to the invention meet the product specifications set forth in ASTM C1178/C1178M-11. For example, with respect to nail pull resistance, product according to some embodiments of the invention have a nail pull resistance of at least about 40 pounds, such as at least about 70 pounds, or at least about 90 pounds. The nail pull resistance may vary depending on the thickness of a board. In the case of ¼" board thickness, the nail pull resistance in accordance with embodiments of the invention is at least about 40 pounds. In the case of ½" board thickness, the nail pull resistance, in accordance with some embodiments of the invention is at least about 70 pounds. In the case of ⅝" board thickness, the nail pull resistance in accordance with some embodiments of the invention is at least about 90 pounds.

Product according to embodiments of the invention also exhibit desirable flexural strength properties. For example, in some embodiments, the flexural strength is at least about 40 pounds (e.g., at least about 80 pounds, or at least about 100 pounds) bearing edges parallel to the board edge, or at least about 50 pounds (e.g., at least about 100 pounds, or at least about 140 pounds) bearing edges perpendicular to the board edge. The flexural strength may vary depending on board thickness. In the case of ¼" board thickness, the flexural strength in some embodiments is at least about 40 pounds bearing edges parallel to the board edge, and/or about 50 pounds bearing edges perpendicular to the board edge. In the case of ¼" board thickness, the flexural strength in some embodiments is at least about 80 pounds bearing edges parallel to the board edge, and/or at least about 100 pounds bearing edges perpendicular to the board edge. In the case of ⅝" board thickness, the flexural strength in some embodiments is at least about 100 pounds bearing edges parallel to the board edge, and/or at least about 140 pounds bearing edges perpendicular to the board edge.

Product according to embodiments of the invention also surprisingly and unexpectedly achieves desirable core, end, and edge hardness, as well as desirable surface water absorption, humidified deflection, and shear bond strength. For example, in some embodiments, the average core, end, and edge hardness is at least about 15 pounds. The average surface water absorption of the face side of the board in some embodiments is not more than about 0.50 grams after 2 hours of elapsed time. Regarding humidified deflection, the average deflection of the boards in some embodiments is not more than about 2 inches, such as not more than about 1 inch. The humidified deflection may vary depending on board thickness. In the case of the ½" thick board, in some embodiments, the average humidified deflection is not more than about 2 inches. In the case of ⅝" thick board, the average humidified deflection is not more than about 1 inch. The shear bond strength in some embodiments of the invention is at least about 50 psi when tested in accordance with ASTM C1325. In some embodiments, the finish composition has a pH of at least about 9, such as at least about 9.5, or at least about 10.

The finish composition is also useful to give favorable properties to one or more sides of an article. A finish for use as an underlayment of ceramic tile can be prepared preferably by rolling or screeding the slurry onto a base mat or scrim. The finished side of a ceramic tile could be finished to provide a deformable surface. Statuary or architectural moldings could be made of a different core, then finished with sufficient thickness of this composition to allow the piece to be shaped, carved, fit or detailed using common tools.

The hydraulic component, polymer, silane compound, water and any optional components are combined in a mixer and mixed until a homogeneous blend is obtained. Preferably, the mixer is a high shear mixer providing a short residence time. For small batches of product, a typical laboratory blender is a suitable mixing device. For larger commercial operations, the use of commercially available continuous mixers, e.g., as manufactured by the PFT GMBH and Co. KG, based in Iphofen, Germany, are suitable. Continuous mixers have the capability of mixing as well as pumping the slurry in a continuous manner to the point of application. These mixers have a mixing chamber where all solid dry materials are blended together with the liquid additives including water using a cage agitator rotating at a high speed. In the normal mode of operation, the blended cementitious slurry continuously exits the mixing chamber and is pumped forward by a progressive cavity pump (rotor-stator type pump) to the point of application. The preferred PFT mixer models for this invention include PFT Mixing Pump G4, PFT Mixing Pump G5, PFT Monojet 2.13, PFT Mixing Pump T2E, PFT Mixing Pump MS1 and MS2.

Another preferred mixer is a high-shear batch mixer. The batch mixer is preferred in some applications, particularly where the slurry must be fed to more than one area of the manufacturing line. The wet ingredients are changed to the mixer, followed by the dry components. After mixing, the entire batch is dumped into a pot for continuous distribution to the line. If distribution to more than one location is desired, multiple pumps with separate destinations can be used to distribute the slurry from the pot.

After mixing, the flowable slurry exits from the mixer and can be poured into a mold or extruder, onto release paper or onto a base mat for shaping into an appropriate shape. Any method may be used to shape the composition, including molding, extruding, troweling, calendaring, rolling, screeding, or any shaping method suitable for the article being produced.

Thus, in an embodiment, a mat-faced gypsum board comprises gypsum based core, fibrous mat having an inner surface facing at least one face of the gypsum-based core, and hydrophobic finish comprising hydraulic component comprising Class C fly ash, film-forming polymer, and a silane compound.

In another embodiment, the board passes the test for waterproofness in accordance with ANSI A118.10 (revised October 2008).

In another embodiment, when the board is cast as ½" thick board, the board has a nail pull resistance of at least about 70 pounds in accordance with ASTM C1178/C1178M-11.

In another embodiment, when the board is cast as ½" thick board, the board has a flexural strength of at least about 80 pounds bearing edges parallel to the board edge and/or at least about 100 pounds bearing edges perpendicular to the board edge, in accordance with ASTM C1178/C1178M-11.

In another embodiment, the silane compound is within the general chemical formula:

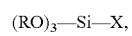

(RO)₃—Si—X, where RO is an alkoxy group and X is an organofunctional group.

In another embodiment, RO is methoxy or ethoxy.

In another embodiment. X is a hydrophobicity providing group.

In another embodiment, X is a methyl, ethyl, propyl, butyl, pentyl, hexyl or octyl.

In another embodiment, the silane compound (e.g., alkyl alkoxysilane) has a molecular weight of at least about 150 Daltons.

In another embodiment, the silane compound is in an amount from about 0.1% to about 5% by weight of the wet finish.

In another embodiment, the silane compound is one or more of octyltriethoxy silane, isooctyltriethoxy silane, octyltrimethoxy silane, isooctyltrimethoxy silane, butyltriethoxy silane, isobutyltriethoxy silane, butyltrimethoxy silane, or isobutyltrimethoxy silane.

In another embodiment, the hydraulic component comprising Class C fly ash is in an amount from about 50% to about 85% by weight of the wet finish.

In another embodiment, the Class C fly ash has a calcium oxide content of at least about 15% by weight of the fly ash or hydraulic component.

In another embodiment, the film-forming polymer comprises one or more of the following: acrylic polymers and copolymers, rubber-based polymers and copolymers such as styrene-butadiene rubber, copolymers of styrene and acrylic, copolymers of vinyl acetate and ethylene, copolymers of vinyl chloride and ethylene, copolymers of vinyl acetate and VeoVa (vinyl ester of versatic acid), copolymers of vinyl laurate and ethylene, terpolymers of vinyl acetate, ethylene and methylmethaacrylate, terpolymers of vinyl acetate, ethylene and vinyl laurate, terpolymers of vinyl acetate, ethylene and VeoVa (vinyl ester of versatic acid), and any combination thereof.

In another embodiment, the film-forming polymer is in an amount from about 5% to about 25% by weight of the wet finish.

In another embodiment, the finish has a pH of at least about 9.

In another embodiment, the fibrous mat comprises polymer or mineral fiber.

In another embodiment, there are two mats, with one mat on either side of the core to form a sandwich structure.

In another embodiment, the hydrophobic finish faces both mats.

In another embodiment, the polymer or mineral fibers are glass fibers, polyester fiber, or any combination thereof.

In another embodiment, the mat and finish form a composite having a thickness of about 0.03 inches or less.

In another embodiment, the mat and finish form a composite having a density from about 75 to about 115 pcf.

In another embodiment, the finish has a weight from about 60 lb/MSF to about 160 lb/MSF.

In another embodiment, the finish penetrates at least about 80% into the mat.

In another embodiment, the finish sets and dries in about 45 minutes or less under conditions of 75° F. and 50% relative humidity (RH).

In another embodiment, the finish substantially sets and dries in about 3 minutes or less at a temperature of about 175° F.

In another embodiment, the fibrous mat comprises two parts, with one part on either side of the core to form a sandwich structure.

In another embodiment, the hydrophobic finish faces both parts of the mat.

In another embodiment, the film-forming polymer comprises one or more of the following: acrylic polymers and copolymers, rubber-based polymers and copolymers such as styrene-butadiene rubber, copolymers of styrene and acrylic, copolymers of vinyl acetate and ethylene, copolymers of vinyl chloride and ethylene, copolymers of vinyl acetate and VeoVa (vinyl ester of versatic acid), copolymers of vinyl laurate and ethylene, terpolymers of vinyl acetate, ethylene and methylmethaacrylate, terpolymers of vinyl acetate, ethylene and vinyl laurate, terpolymers of vinyl acetate, ethylene and VeoVa (vinyl ester of versatic acid), and any combination thereof, wherein the film-forming polymer is in an amount from about 5% to about 25% by weight of the wet finish, the silane compound is an alkyl alkoxysilane in an amount from about 0.1% to about 5% by weight of the wet finish, the board passes the test for waterproofness according to ANSI A118.10 (revised October 2008), when the board is cast as a ½" thick board, the board has a nail pull resistance of at least about 70 pounds in accordance with ASTM C1178/C1178M-11, when the board is cast as ½" thick board, the board has a flexural strength of at least about 80 pounds bearing edges parallel to the board edge and/or at least about 100 pounds bearing edges perpendicular to the board edge, in accordance with ASTM C1178/C1178M-11, the hydraulic component is in an amount from about 50% to about 85% by weight of the wet finish, and/or the finish has a pH of at least about 9.

In another embodiment, the finish composition comprises, consists of, or consists essentially of hydraulic component comprising Class C fly ash in an amount from about 50 to about 85 percent by weight of the finish composition, film-forming polymer in an amount from about 5 to about 25 percent by weight of the finish composition, alkyl alkoxysilane in an amount from about 0 to about 5 percent by weight of the finish composition, water reducing admixture in an amount from about 0 to about 5 percent by weight of the finish composition, filler in an amount from about 0 to about 50 percent by weight of the finish composition, colorant in an amount from about 0 to about 2 percent by weight of the finish composition, other optional additives in an amount from about 0 to about 20 percent by weight of the finish composition, and water in an amount from about 10 to about 30 percent by weight of the finish composition.

In another embodiment, the mat and finish form a composite having a thickness from about 0.0075 to about 0.40 inches and a density from about 65 to about 125 pcf, wherein the finish has a weight from about 40 to about 200 lb/MSF, the finish penetrates at least about 60% into the mat, and the finish has a pH of at least about 9.

In another embodiment, the finish substantially sets and dries in about 45 minutes or less under conditions of about 75° F. and about 50% relative humidity, and the finish substantially sets and dries in about 3 minutes or less at a temperature of about 175° F.

In another embodiment, a mat-faced gypsum board comprising gypsum based core, fibrous mat comprising polymer or mineral fiber, wherein the mat has an inner surface facing at least one face of the gypsum-based core, and hydrophobic finish consisting essentially of: hydraulic component comprising Class C fly ash in an amount from about 50% to about 85% by weight of the wet finish, one or more of the following film-forming polymers: acrylic polymers and copolymers, rubber-based polymers and copolymers such as styrene-butadiene rubber, copolymers of styrene and acrylic, copolymers of vinyl acetate and ethylene, copolymers of vinyl chloride and ethylene, copolymers of vinyl acetate and VeoVa (vinyl ester of versatic acid), copolymers of vinyl laurate and ethylene, terpolymers of vinyl acetate, ethylene and methylmethaacrylate, terpolymers of vinyl acetate, ethylene and vinyl laurate, terpolymers of vinyl acetate, ethylene and VeoVa (vinyl ester of versatic acid), and any combination thereof, wherein the film-forming polymer is in an amount from about 5% to about 25% by weight of the wet finish, and alkyl alkoxysilane in an amount from about 0.1% to about 5% by weight of the wet finish.

In another embodiment, board comprises (a) gypsum-based core, (b) fibrous mat comprising polymer or mineral fiber, wherein the mat has an inner surface facing at least one face of the gypsum-based core, and (c) hydrophobic finish consisting essentially of hydraulic component comprising Class C fly ash, film-forming polymer, and alkyl alkoxysilane. The hydraulic component comprising Class C fly ash can be, for example, in an amount from about 50% to about 85% by weight of the wet finish composition. The film-forming polymer can be, for example, in an amount from about 5% to about 25% by weight of the wet finish composition.

In embodiments in which the finish composition consists essentially of hydraulic component comprising Class C fly ash, film-forming polymer, and silane compound, the embodiments preclude the inclusion of any compound other than the aforesaid hydraulic component comprising Class C fly ash, film-forming polymer, and alkyl alkoxysilane, that materially affects the inventive composition (e.g., compounds that considerably hamper the water resistance effect or adversely reduce strength or flowability significantly). Thus, compounds that would be excluded in a finish composition consisting essentially of hydraulic component comprising Class C fly ash, film-forming polymer, and alkyl alkoxysilane would include fillers, aggregate, or calcium carbonate with a mean particle size above 3000 microns; silica, alumina, or iron oxide in a combined amount above 50% by weight of the hydraulic component; Portland cement in an amount above 50% by weight of the hydraulic component; quick lime in an amount above 10% by weight of the hydraulic component; and hydrated lime in an amount above 25% by weight of the hydraulic component. Compounds that would not be excluded in a finish composition consisting essentially of hydraulic component comprising Class C fly ash, film-forming polymer, and alkyl alkoxysilane are compounds that do not materially affect the finish composition, such as water, defoamers, fillers such as mica, clays, gums, preservatives, solvents and other additives (e.g., binders, alcohols, biocides, colorings), water reducing admixture additives, as well as other compounds that do not considerably hamper the water resistance effect or adversely reduce strength or flowability significantly when in a finish composition.

In another embodiment, the mat and finish form a composite having a thickness from about 0.0075 to 0.40 inches and a density from about 65 to about 125 pcf, wherein the finish has a weight from about 40 to about 200 lb/MSF, the finish penetrates at least about 60% into the mat, and the finish has a pH of at least about 9.

In another embodiment, the finish substantially sets and dries in about 45 minutes or less under conditions of about 75° F. and about 50% relative humidity, and the finish substantially sets and dries in about 3 minutes or less at a temperature of about 175° F.

In another embodiment, an article comprises a cementitious core material and a finish composition facing the cementitious core, wherein the finish composition comprises Class C fly ash, film-forming polymer, and silane compound, wherein the silane is within the general chemical formula:

(RO)$_3$—Si—X, where RO is an alkoxy group and X is an organofunctional group, and/or (b) has a molecular weight of at least about 150.

It shall be noted that the preceding are merely examples of embodiments. Other exemplary embodiments are apparent from the entirety of the description herein. It will also be understood by one of ordinary skill in the art that each of these embodiments may be used in various combinations with the other embodiments provided herein.

The following examples further illustrate the invention but, of course, should not be construed as in any way limiting its scope.

Example 1—Comparative

This example illustrates the poor water penetration resistance of unfinished glass mat reinforced gypsum panels.

Half inch thick SECUROCK® roof board, commercially available from USG (Chicago, Ill.), was used to conduct the test. The glass mat used for manufacturing the gypsum panels was substantially porous, contained no added finish, and was surface bonded to the gypsum core. The water penetration resistance test performed is briefly described below.

A two inch diameter, 48 inch tall hollow plastic tube is firmly secured and sealed on top surface of the test panel. The plastic tube is filled with tap water all the way to the top to a height of 48 inches. Drop in water level as a function of time was monitored and recorded. Observations are also made for occurrences of water leakage and leakage locations. FIG. 1A shows a test equipment arrangement for the water penetration test.

Figure 1B:
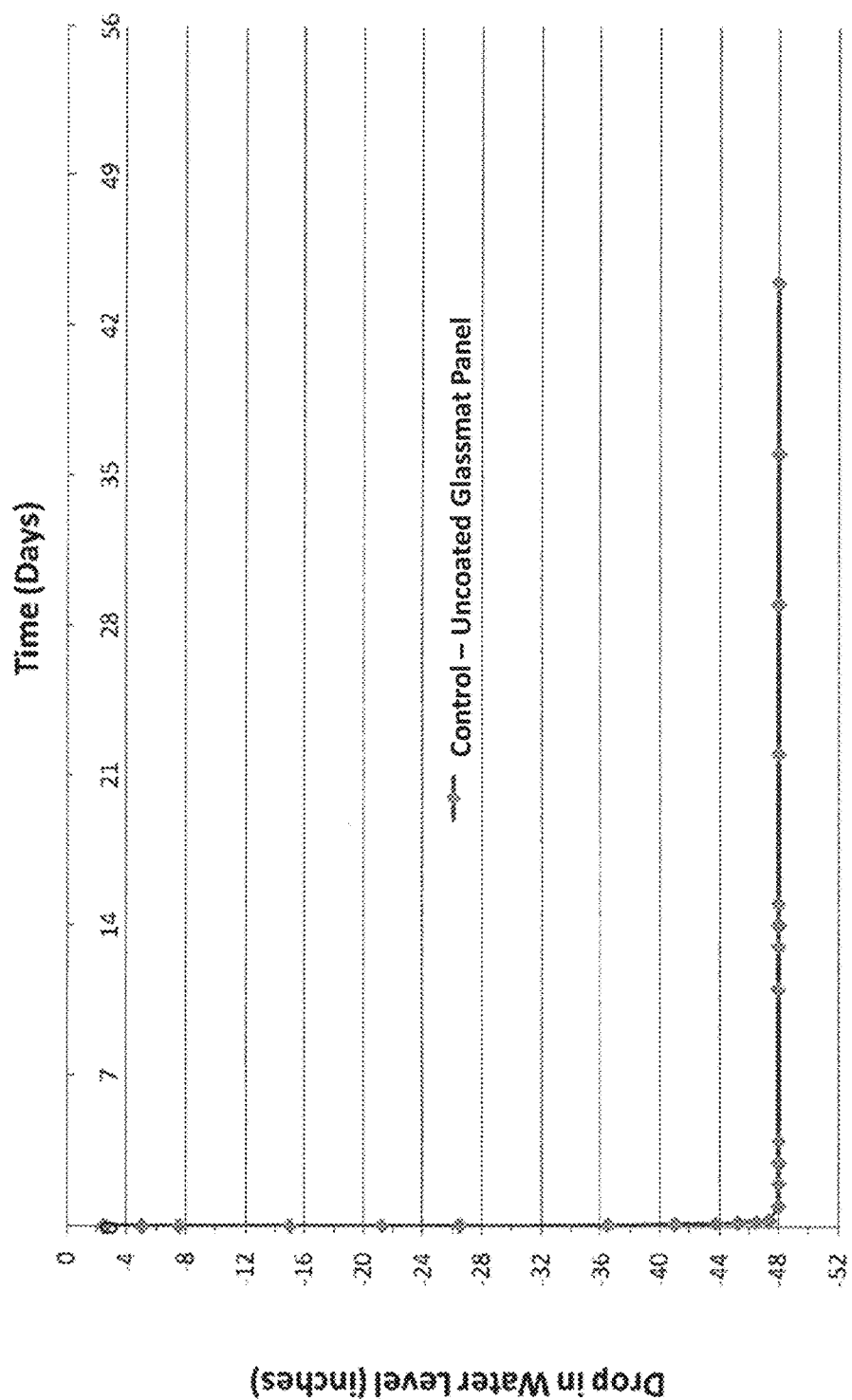
FIG. 1B is a graph of drop in water level (inches) versus time (days), which illustrates water penetration resistance testing for unfinished glass mat reinforced gypsum panel without a finish for comparative purposes, as set forth in Example 1.

FIG. 1B shows water penetration resistance testing results for the unfinished glass mat reinforced gypsum panels. The drop in water level in the plastic tube as a function of time was measured and recorded. From FIG. 1B it can be seen that the unfinished glass mat reinforced gypsum panel had significantly poor water holding capacity. The water began to leak out through the top surface of the panel as soon as the tube was filled with water. The rate of water loss from the tube was very rapid such that within 24 hours the tube was virtually empty. The bottom surface of the panel was completely dry and no water penetrated through the gypsum core. The entire water leaked through the porous glass mat layer on the top panel surface on which the plastic tube was mounted.

Figure 1C:
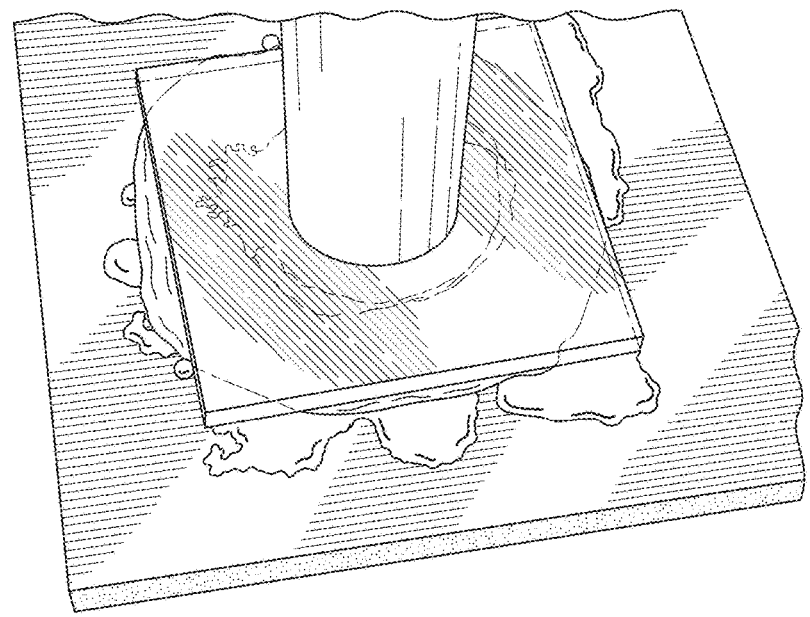
FIG. 1C illustrates water leakage observed on the top surface of the unfinished glass mat gypsum panel of Example 1.
Figure 1D:
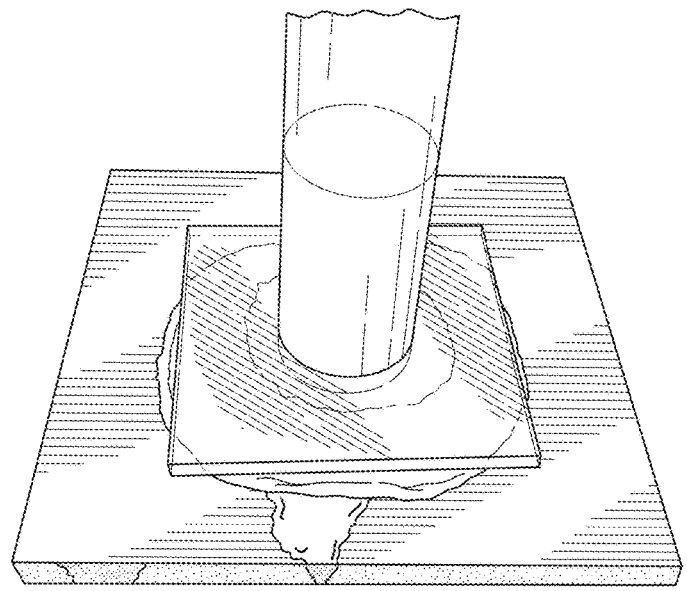
FIG. 1D illustrates water leakage at 4-hours on the top surface of the unfinished glass mat gypsum panel of Example 1.
Figure 1E:
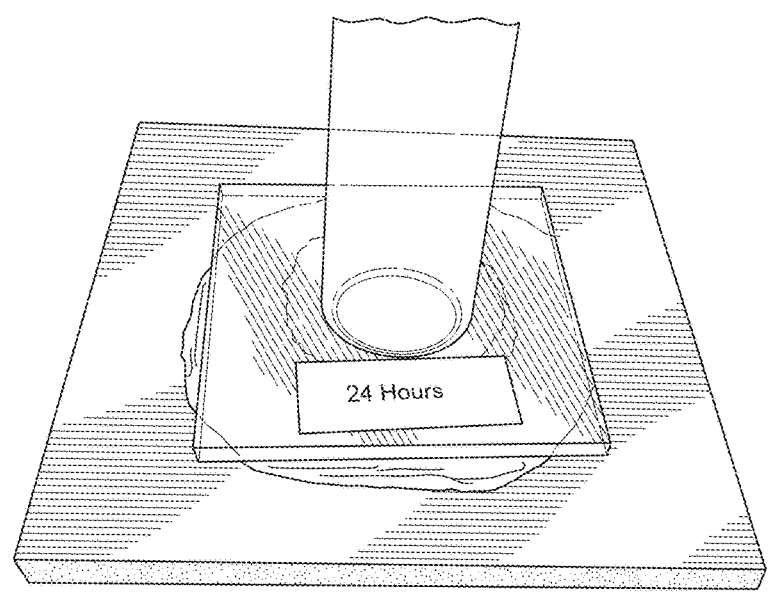
FIG. 1E illustrates water leakage at 24-hours on the top surface of the unfinished glass mat gypsum panel of Example 1.

FIG. 1C shows water leakage on the top surface of the unfinished glass mat gypsum panel soon after the test was initiated. Isolated pools of water began to appear as soon as water was filled in the plastic tube. FIG. 1D shows water leakage at 4-hours on the top surface of the unfinished glass mat gypsum panel. It can be observed that the top surface of the glass mat was fully saturated with the leaking water. FIG. 1E depicts the water penetration resistance testing assembly at 24-hours. The plastic tube was virtually empty of water at 24-hours due to the rapid rate of water loss that occurred during the test.

Example 2

This Example illustrates improved water resistance for finished panels in accordance with embodiments of the invention.

Half inch thick SECUROCK® roof board was used as the base panel for application of the cementitious finish. The glass mat used for manufacturing the gypsum panels was substantially porous, and was surface bonded to the gypsum core with no added finish initially present.

Figure 2A:
FIG. 2A illustrates a finished glass mat panel as set forth in Example 2.

The glass mat panel was finished using a special flexible cementitious finish having formulation as shown in Table 12. The raw materials shown in Table 12 were mixed together in a blender for about 30 seconds. The resulting aqueous finish was screeded on the top surface of a ½" thick glass mat reinforced gypsum panel. A single pass of finish layer was applied on the panel. The resulting panel was identified as Sample A. The finish was allowed to cure and dry under ambient conditions. It took approximately 30 minutes for the finish to dry out and give the panel a non-sticky surface. FIG. 2A depicts a finished glass mat gypsum panel.

TABLE 12

| Finish formulation used to finish panel (Sample A) | |
|---|---|
| Ingredient | Wt % |
| Fly ash Class C | 66.83% |
| Acrylic polymer - FORTON VF 774 Liquid Polymer | 32.76% |
| Colorant - Ajack Black SC | 0.08% |
| Superplasticizer - Melflux 267L | 0.33% |
| Octyl Triethoxysilane - Prosil 9202 | 0.00% |

The details of the cementitious finish applied on the glass mat panel (Sample A) were as set forth in Table 13:

TABLE 13

| Number of finish passes | One |
|---|---|
| Finish thickness | 11 mils |
| Finish weight | 53 lb/msf |
| Density of finished glass mat composite | 85 pcf |
| Finish penetration depth through the glass mat | >90% |

Figure 2B:
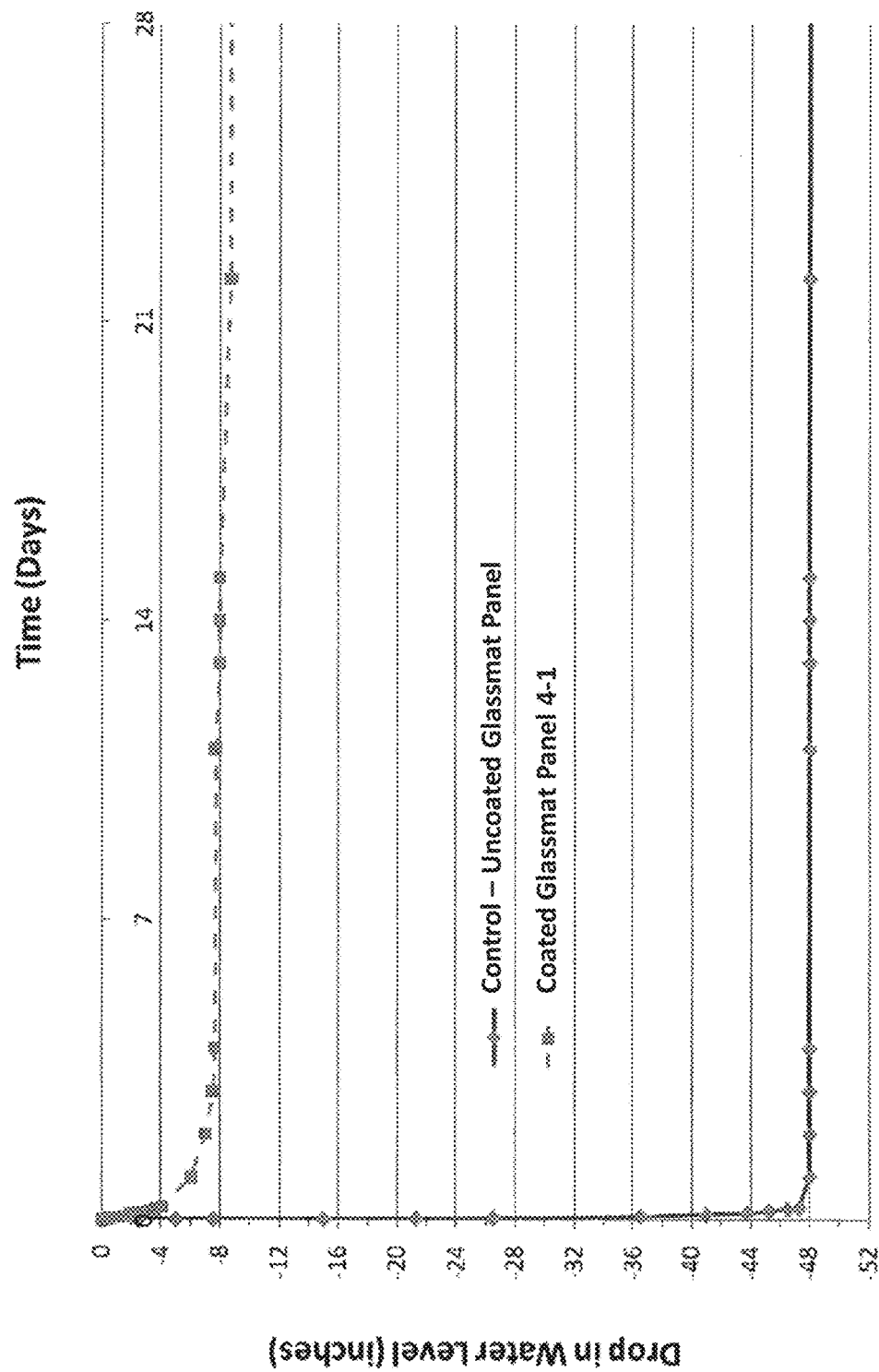
FIG. 2B is a graph of drop in water level (inches) versus time (days), which illustrates water penetration resistance testing results for finished glass mat reinforced gypsum panel of Sample A set forth in Example 2.

A water resistance test was conducted as described in Example 1 with the test equipment arrangement shown in FIG. 1A. FIG. 2B shows water penetration resistance testing results for the finished glass mat reinforced gypsum panel for Sample A. The drop in water level in the plastic tube as a function of time was measured and recorded. From FIG. 2B it can be observed that the application of finish significantly improved the water penetration resistance performance of the panel. However, the applied finish did not provide complete water penetration resistance and let some amount of water to pass through as depicted by the drop in water level in FIG. 2B. The drop in water level as a function of time was measured as set forth in Table 14:

TABLE 14

| 3-Day Drop in Water Level | 7.50 inches |
| 14-Day Drop in Water Level | 8.00 Inches |
| 28-Day Drop in Water Level | 8.75 inches |

Figure 2C:
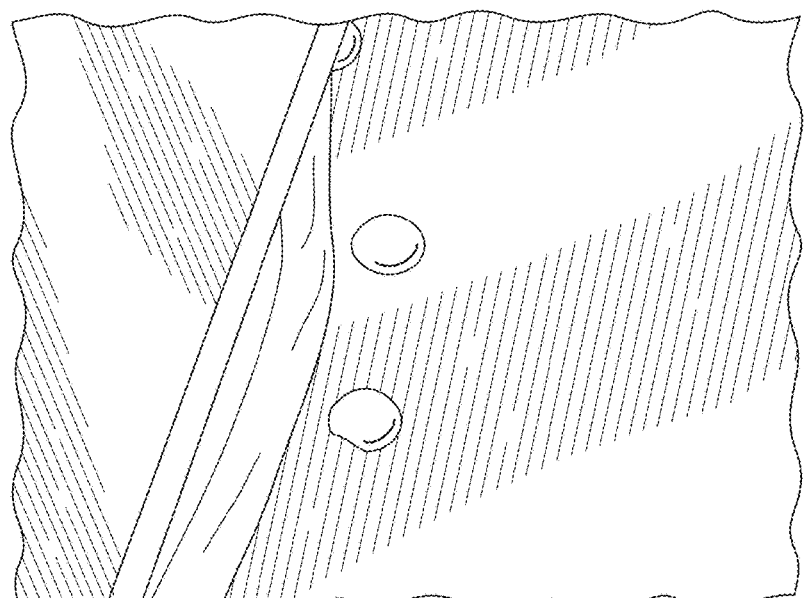
FIG. 2C illustrates water penetration resistance testing results for the finished glass mat reinforced gypsum panel of Sample A set forth in Example 2.
Figure 2D:
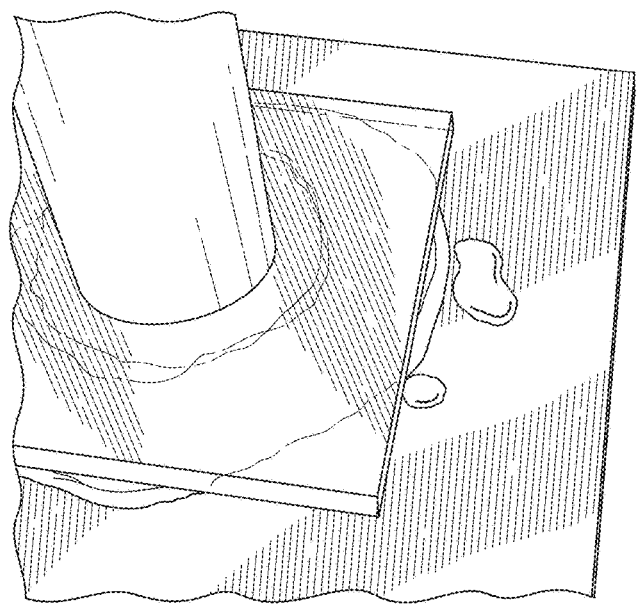
FIG. 2D illustrates water penetration resistance testing results for the finished glass mat gypsum panel of Sample A set forth in Example 2.
Figure 2E:
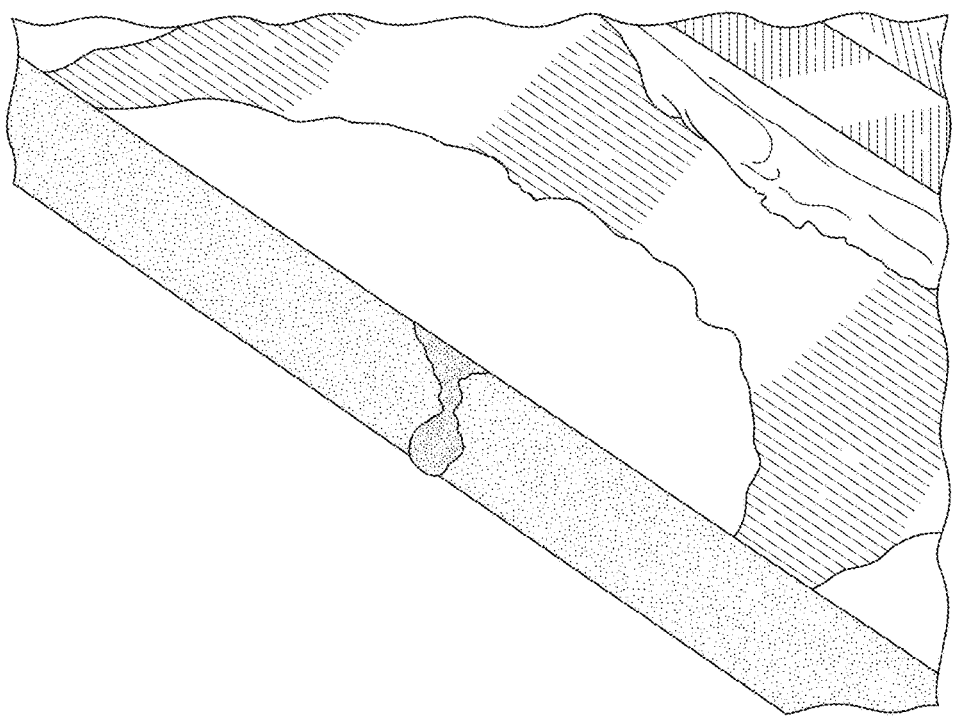
FIG. 2E illustrates water penetration resistance testing results for the finished glass mat gypsum panel of Sample A set forth in Example 2.

It was further observed that water leakage through the panel occurred on the top finish side of the panel itself as shown in FIGS. 2C and 2D. Water droplets were observed on the top surface of the panel within 30 minutes of filling the 48" column with water. Liquid water seen in FIG. 2E traversed through the residual porosity present in the finished glass mat fabric and exited on the top at the cut edge of the panel. However, there was no evidence of water penetrating through the thickness of the panel. The panel bottom surface was observed to remain completely dry throughout the duration of the test.

Example 3

This Example illustrates improved water resistance for finished panels in accordance with embodiments of the invention. Half inch thick SECUROCK® roof board was used as the base panel for application of the cementitious finish. The glass mat used for manufacturing the gypsum panels was substantially porous, and was surface bonded to the gypsum core with no added finish initially present.

The glass mat panel was finished using a special flexible cementitious finish having formulation as shown in Table 15. The raw materials shown in Table 15 were mixed together in a blender for about 30 seconds. The resulting aqueous finish was screeded on the top surface of a ½" thick glass mat reinforced gypsum panel. A single pass of finish layer was applied on the panel. The resulting panel was identified as Sample B. The finish was allowed to cure and dry under ambient conditions. It took approximately 30 minutes for the finish to dry out and give the panel a non-sticky surface.

TABLE 15

Finish formulation used to finish panel (Sample B)

| Ingredient | Wt % |
|---|---|
| Fly ash Class C | 66.83% |
| FORTON VF 774 Liquid Polymer | 32.76% |
| Ajack Black SC | 0.08% |
| Superplasticizer-Melflux 267L | 0.33% |
| Octyl Triethoxysilane - Prosil 9202 | 0.00% |

The details of the cementitious finish applied on the glass mat panel (Sample B) were as set forth in Table 16.

TABLE 16

| Number of finish passes | One |
| Finish thickness | 10 mils |
| Finish weight | 46 lb/msf |
| Density of finished glass mat composite | 83 pcf |
| Finish penetration depth through the glass mat | >90% |

A water resistance test was conducted as described in Example 1 with the test equipment arrangement shown in FIG. 1A.

Figure 3A:
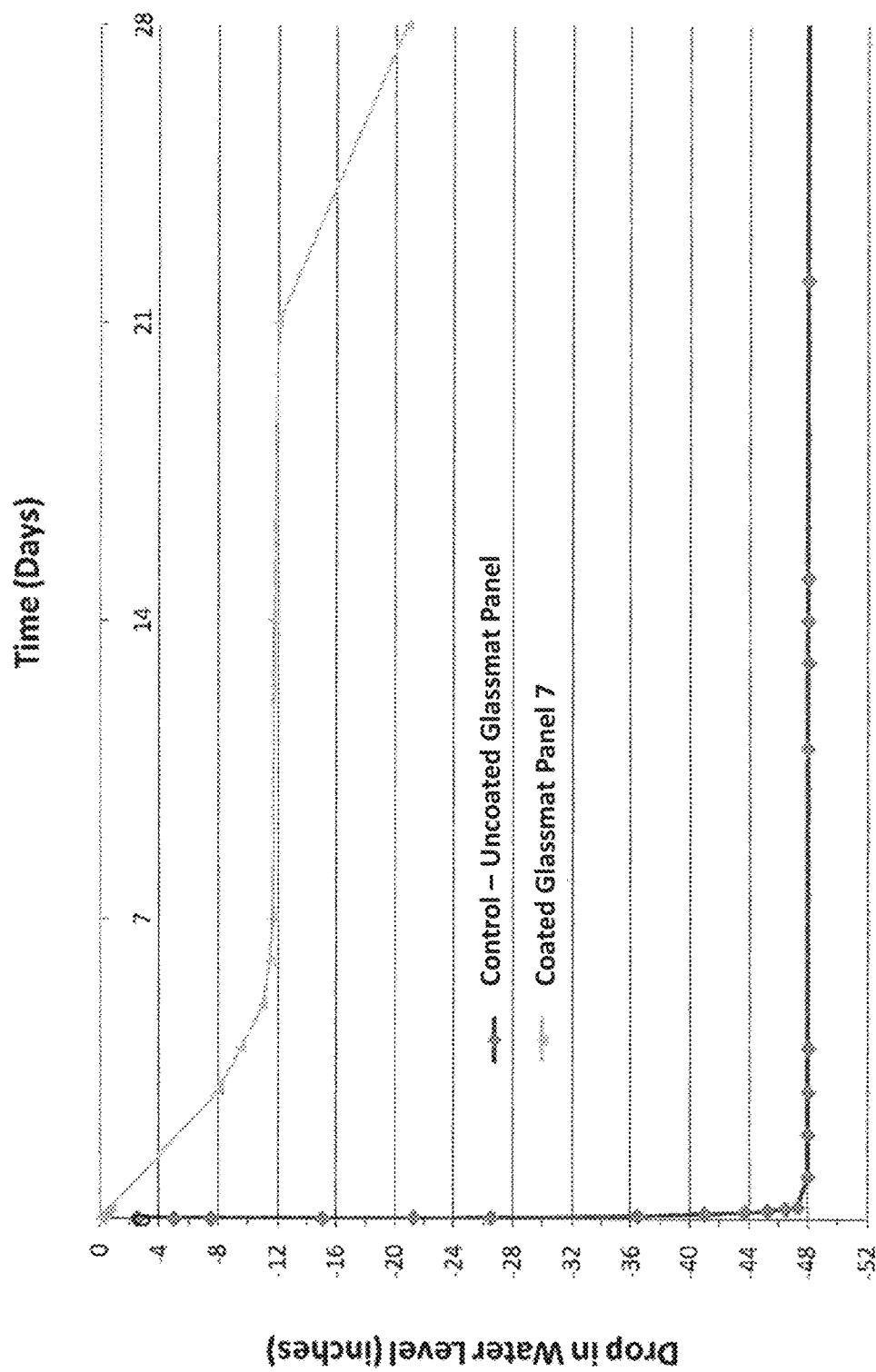
FIG. 3A is a graph of drop in water level (inches) versus time (days), which illustrates water penetration resistance testing for finished glass mat reinforced gypsum panel of Sample B set forth in Example 3.

FIG. 3A shows water penetration resistance testing results for the finished glass mat reinforced gypsum panel for Sample B. The drop in water level in the plastic tube as a function of time was measured and recorded. From FIG. 3A it can be observed that the application of finish significantly improved the water penetration resistance performance of the panel. However, the applied finish did not provide complete water penetration resistance and let some amount of water to pass through as depicted by the drop in water level in FIG. 3A. The drop in water level as a function of time was measured as set forth in Table 17.

TABLE 17

| 3-Day Drop in Water Level | 8.00 inches |
| 14-Day Drop in Water Level | 11.75 Inches |
| 28-Day Drop in Water Level | 20.75 inches |

It was further observed that water leakage through the panel occurred on the top finished side of the panel itself. Water droplets were observed on the top surface of the panel within 30 minutes of filling the 48" column with water. However, there was no evidence of water penetrating through the thickness of the panel. The panel bottom surface was observed to remain completely dry throughout the duration of the test.

Example 4

This Example illustrates improved water resistance for finished panels in accordance with embodiments of the invention. Half inch thick SECUROCK® roof board was used as the base panel for application of the cementitious finish. The glass mat used for manufacturing the gypsum panels was substantially porous, and was surface bonded to the gypsum core with no added finish initially present.

The glass mat panel was finished using a special flexible cementitious finish having formulation as shown in Table 18. The raw materials shown in Table 18 were mixed together in a blender for about 30 seconds. The resulting aqueous finish was screeded onto the top surface of a ½" thick glass mat reinforced gypsum panel. A single pass of finish layer was applied on the panel. The resulting panel was identified as Sample C. The finish was allowed to cure and dry under ambient conditions. It took approximately 30 minutes for the finish to dry out and give the panel a non-sticky surface.

TABLE 18

Finish formulation used to finish panel (Sample C)

| Ingredient | Wt % |
|---|---|
| Fly ash Class C | 66.83% |
| FORTON VF 774 Liquid Polymer | 32.76% |
| Ajack Black SC | 0.08% |

TABLE 18-continued

Finish formulation used to finish panel (Sample C)

| Ingredient | Wt % |
|---|---|
| Superplasticizer, Melflux 267L | 0.33% |
| Octyl Triethoxysilane - Prosil 9202 | 0.00% |

The details of the cementitious finish applied on the glass mat panel of Sample C were as set forth in Table 19.

TABLE 19

| | |
|---|---|
| Number of finish passes | One |
| Finish thickness | 11 mils |
| Finish weight | 51 lb/msf |
| Density of finished glass mat composite | 81 pcf |
| Finish penetration depth through the glass mat | >90% |

A water resistance test was conducted as described in Example 1 with the test equipment arrangement shown in FIG. 1A.

Figure 4A:
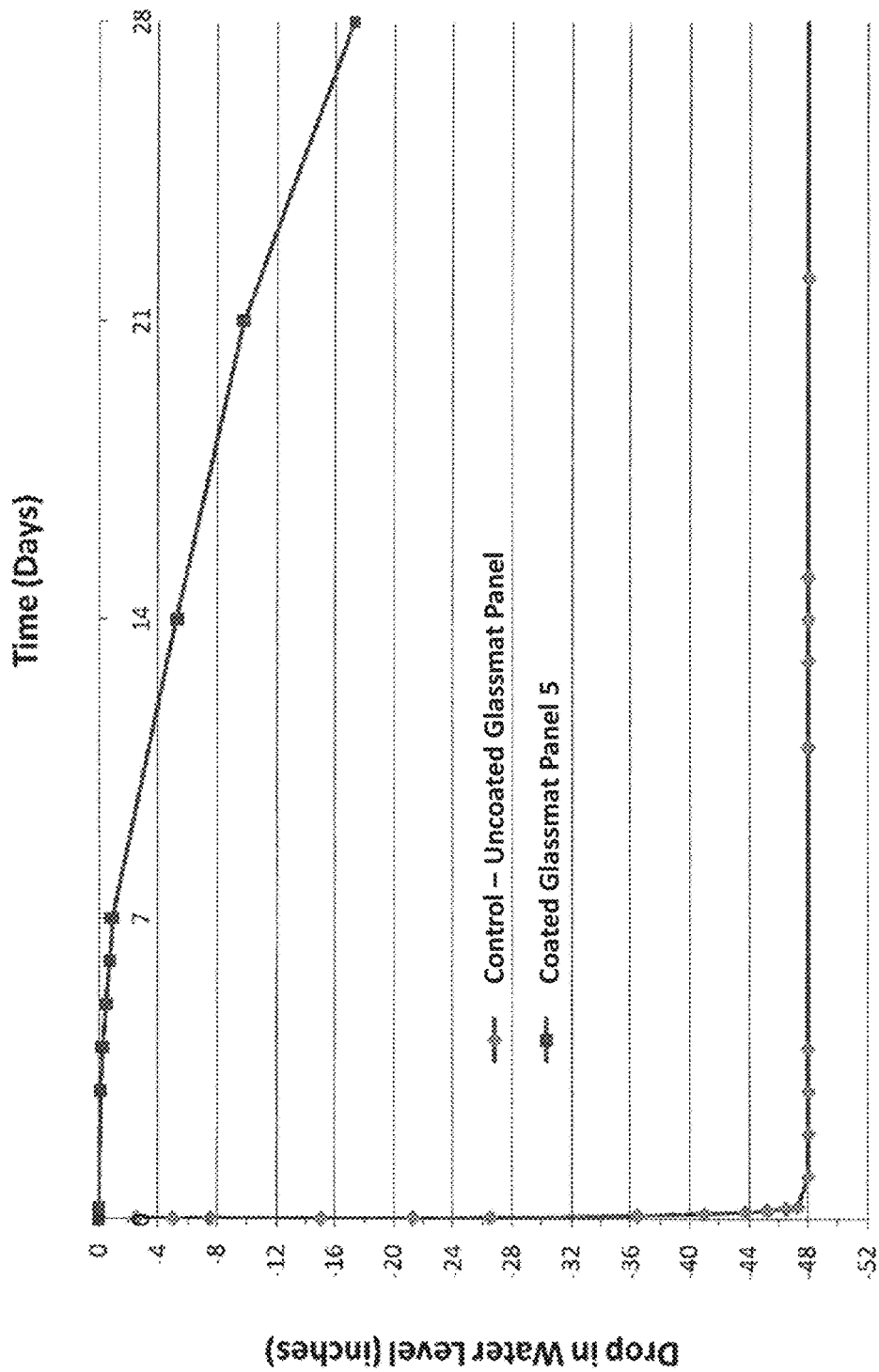
FIG. 4A is a graph of drop in water level (inches) versus time (days), which illustrates water penetration resistance testing for finished glass mat reinforced gypsum panel of Sample C set forth in Example 4.

FIG. 4A shows water penetration resistance testing results for the finished glass mat reinforced gypsum panel for Sample C. The drop in water level in the plastic tube as a function of time was measured and recorded. From FIG. 4A it can be observed that the application of finish significantly improved the water penetration resistance performance of the panel. However, the applied finish did not provide complete water penetration resistance and let some water to pass through as depicted by the drop in water level in FIG. 4A. The drop in water level as a function of time was measured as set forth in Table 20.

TABLE 20

| | |
|---|---|
| 3-Day Drop in Water Level | 0.125 inches |
| 14-Day Drop in Water Level | 5.25 inches |
| 28-Day Drop in Water Level | 17.25 inches |

It was further observed that water leakage through the panel occurred on the top finished side of the panel itself. Water droplets were observed on the top surface of the panel within 30 minutes of filling the 48" column with water. However, there was no evidence of water penetrating through the thickness of the panel. The panel bottom surface was observed to remain completely dry throughout the duration of the test.

Example 5

This Example illustrates improved water resistance for finished panels in accordance with embodiments of the invention. Half inch thick SECUROCK® roof board was used as the base panel for application of the cementitious finish. The glass mat used for manufacturing the gypsum panels was substantially porous, and was surface bonded to the gypsum core with no added finish initially present.

Figure 5B:
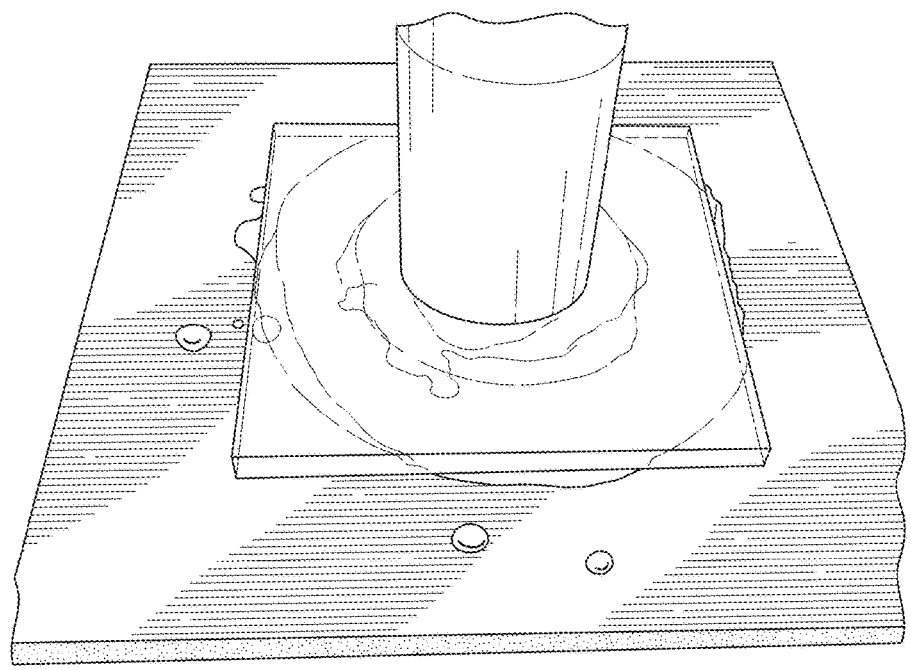
FIG. 5B illustrates water penetration resistance testing for finished glass mat reinforced gypsum panel of Sample D set forth in Example 5.

The glass mat panel was finished using a special flexible cementitious finish having formulation as shown in Table 21. The raw materials shown in Table 21 were mixed together in a blender for about 30 seconds. The resulting aqueous finish was screeded on the top surface of a ½" thick glass mat reinforced gypsum panel. Two passes of finish were applied on the panel. The application of the second pass of finish was done immediately after the application of the first pass. It should be noted that the application of finish in the 2nd pass was not even and led to a non-uniform finished surface, as seen in FIG. 5B. The resulting panel was identified as Sample D. The finish was allowed to cure and dry out under ambient conditions. It took approximately 30 minutes for the finish to dry out and give the panel a non-sticky surface.

TABLE 21

Finish formulation used to finish panel (Sample D)

| Ingredient | Wt % |
|---|---|
| Fly ash Class C | 66.83% |
| FORTON VF 774 Liquid Polymer | 32.76% |
| Ajack Black SC | 0.08% |
| Superplasticizer, Melflux 267L | 0.33% |
| Octyl Triethoxysilane - Prosil 9202 | 0.00% |

The details of the cementitious finish applied on the glass mat panel (Sample D) were as set forth in Table 22.

TABLE 22

| | |
|---|---|
| Number of finish passes | Two (Second pass non-uniform) |
| Finish thickness | 15 mils |
| Finish weight | 90 lb/MSF |
| Density of finished glass mat composite | 90 pcf |
| Finish penetration depth through the glass mat | >90% |

A water resistance test was conducted as described in Example 1 with the test equipment arrangement shown in FIG. 1A.

FIG. 5A shows water penetration resistance testing results for the finished glass mat reinforced gypsum panel of this example, i.e., Sample D. The drop in water level in the plastic tube as a function of time was measured and recorded. From FIG. 5A it can be observed that the application of finish significantly improved the water penetration resistance performance of the panel. However, the applied finish did not provide complete water penetration resistance and let some amount of water to pass through as depicted by the drop in water level shown in FIG. 5A. The drop in water level as a function of time was measured as set forth in Table 23.

TABLE 23

| | |
|---|---|
| 3-Day Drop in Water Level | 3.56 inches |
| 14-Day Drop in Water Level | 3.69 inches |
| 28-Day Drop in Water Level | 4.25 inches |

It was further observed that water leakage through the panel occurred on the top finished side of the panel itself as shown in FIG. 5B. Water droplets were observed on the top surface of the panel within 30 minutes of filling the 48" column with water. However, there was no evidence of water penetrating through the thickness of the panel. The panel bottom surface was observed to remain completely dry throughout the duration of the test.

Example 6

This Example illustrates improved water resistance for finished panels in accordance with embodiments of the invention. The finished glass mat panel in accordance with embodiments of the invention was prepared using a special flexible cementitious finish having formulation as shown in Table 24. In particular, this Example illustrates the influence of silane, particularly octyl triethoxysilane, on water resistance of the thin, flexible cementitious finish of embodiments of the invention. Octyl triethoxysilane was added at a dosage rate of 0.33% of the total weight of the formulation (or 0.50 wt % of fly ash amount).

Half inch thick SECUROCK® roof board was used as the base panel for application of the cementitious finish. The glass mat used for manufacturing the gypsum panels was substantially porous and was surface bonded to the gypsum core with no added finish initially present.

The raw materials shown in Table 24 were mixed together in a blender for about 30 seconds. The resulting aqueous finish was screeded onto the top surface of a ½" thick glass mat reinforced gypsum panel. Two passes of finish were applied on the panel. The application of the second pass of finish was done immediately after the application of the first pass. The resulting panel was identified as Sample E. The finish was allowed to cure and dry under ambient conditions. It took approximately 30 minutes for the finish to dry out and give the panel a non-sticky surface.

TABLE 24

Finish formulation used to finish panel (Sample E)

| Ingredient | Wt % |
| --- | --- |
| Fly ash Class C | 66.60% |
| FORTON VF 774 Liquid Polymer | 32.65% |
| Ajack Black SC | 0.08% |
| Superplasticizer, Melflux 267L | 0.33% |
| Octyl Triethoxysilane - Prosil 9202 | 0.33% |

The details of the cementitious finish applied on the glass mat panel (Sample E) were as set forth in Table 25.

TABLE 25

| | |
| --- | --- |
| Number of finish passes | Two |
| Finish thickness | 16 mils |
| Finish weight | 95 lb/MSF |
| Density of finished glass mat composite | 91 pcf |
| Finish penetration depth through the glass mat | >90% |

A water resistance test was conducted as described in Example 1 with the test equipment arrangement shown in FIG. 1A.

Figure 6A:
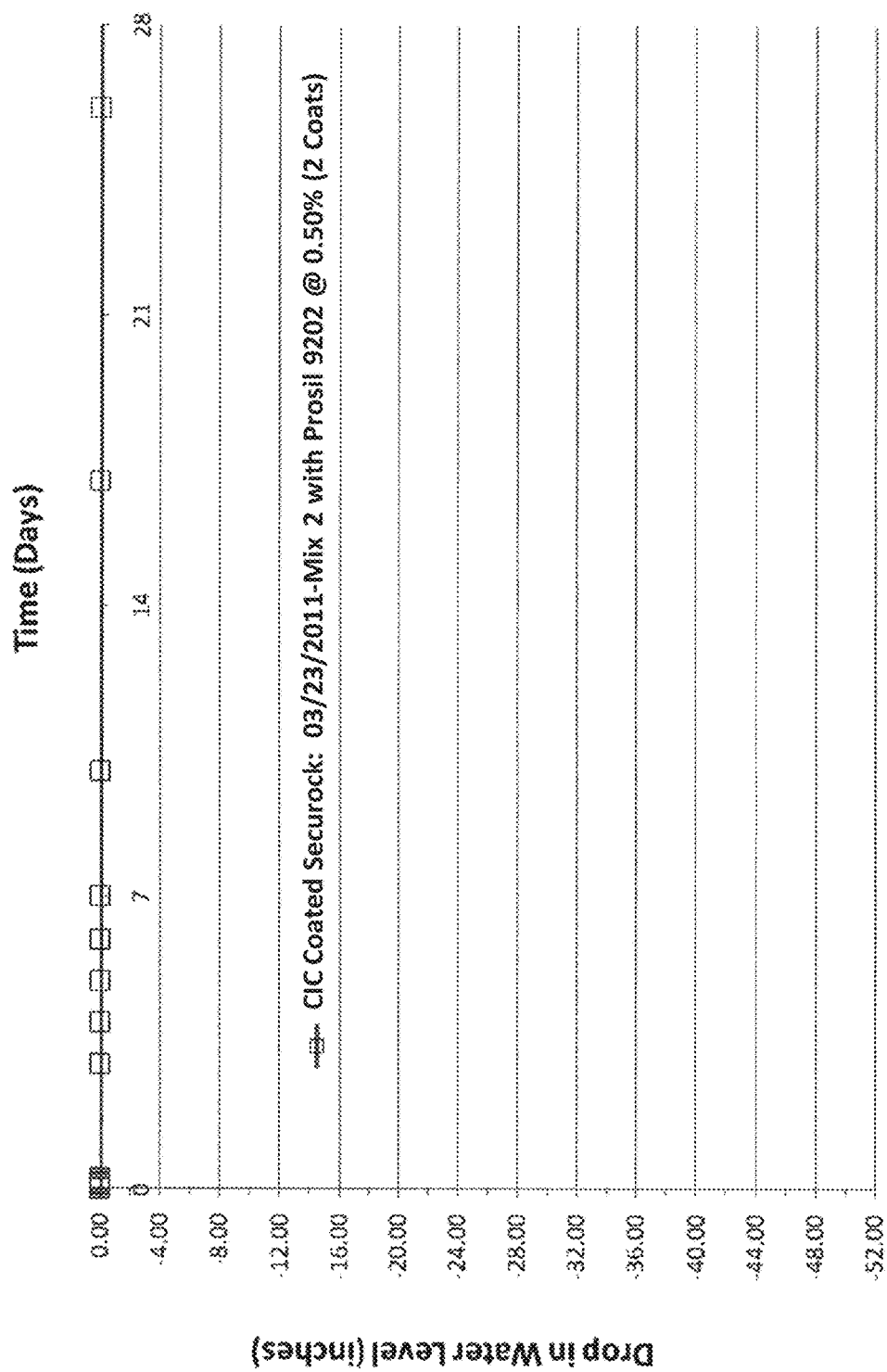
FIG. 6A is a graph of drop in water level (inches) versus time (days), which illustrates water penetration resistance testing for finished glass mat reinforced gypsum panel of Sample E set forth in Example 6.
Figure 6B:
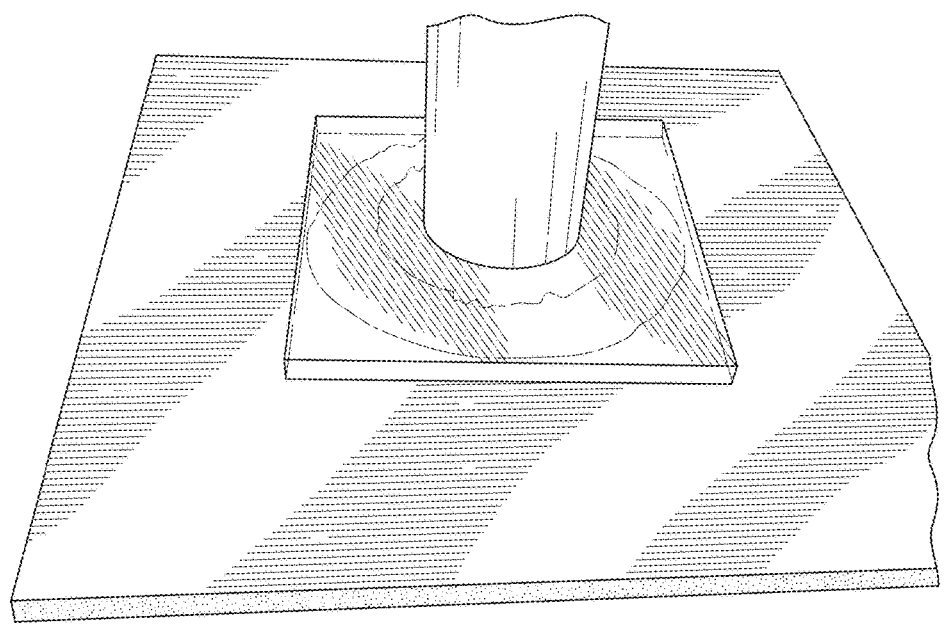
FIG. 6B illustrates water penetration resistance testing for finished glass mat reinforced gypsum panel of Sample E set forth in Example 6.

FIG. 6A shows water penetration resistance testing results for the finished glass mat reinforced gypsum panel of this example, i.e., Sample E. The drop in water level in the plastic tube as a function of time was measured and recorded. From FIG. 6A it can be observed that the application of finish in accordance with embodiments of the invention had a significant influence on improving the water penetration resistance performance of the panel. It is noteworthy that there was no water penetration that occurred though the panel. No leakage or water droplets were observed on the top finished surface of the panel, as seen in FIG. 6B. Also, there was no evidence of water penetration through the thickness of the panel. The panel bottom surface remained completely dry throughout the duration of the test. The drop in water level in the tube as a function of time was measured and recorded as set forth in Table 26.

TABLE 26

| | |
| --- | --- |
| 3-Day Drop in Water Level | 0.00 inches |
| 14-Day Drop in Water Level | 0.00 inches |
| 28-Day Drop in Water Level | 0.00 inches |

This Example demonstrates that the flexible cementitious composition of embodiments of the invention comprising silane such as octyl triethoxysilane provided a high level water penetration resistance to the finished glass mat panels.

Example 7

This Example illustrates improved water resistance for finished panels in accordance with embodiments of the invention. The finished glass mat panel in accordance with embodiments of the invention was prepared using a special flexible cementitious finish having formulation as shown in Table 27. In particular, this Example illustrates the influence of silane such as octyl triethoxysilane on water resistance of the thin, flexible cementitious finish of embodiments of the invention. Octyl triethoxysilane was added at a dosage rate of 0.66% of the total weight of the formulation (or 1.00 wt % of fly ash amount).

Half inch thick SECUROCK® roof board was used as the base panel for application of the cementitious finish. The glass mat used for manufacturing the gypsum panels was substantially porous and was surface bonded to the gypsum core with no added finish initially present.

The raw materials shown in Table 27 were mixed together in a blender for about 30 seconds. The resulting aqueous finish was screeded onto the top surface of a ½" thick glass mat reinforced gypsum panel. Two passes of finish were applied on the panel. The application of the second pass of finish was done immediately after the application of the first pass. The resulting panel was identified as Sample F. The finish was allowed to cure and dry under ambient conditions. It took approximately 30 minutes for the finish to dry out and give the panel a non-sticky surface.

TABLE 27

Finish formulation used to finish panel (Sample F)

| Ingredient | Wt % |
| --- | --- |
| Fly ash Class C | 66.38% |
| FORTON VF 774 Liquid Polymer | 32.54% |
| Ajack Black SC | 0.08% |
| Superplasticizer, Melflux 267L | 0.33% |
| Octyl Triethoxysilane - Prosil 9202 | 0.66% |

The details of the cementitious finish applied on the glass mat panel (Sample F) were as set forth in Table 28.

TABLE 28

| | |
| --- | --- |
| Number of finish passes | Two |
| Finish thickness | 14 mils |
| Finish weight | 78 lb/MSF |
| Density of finished glass mat composite | 88 pcf |
| Finish penetration depth through the glass mat | >90% |

A water resistance test was conducted as described in Example 1 with the test equipment arrangement shown in FIG. 1A.

Figure 7A:
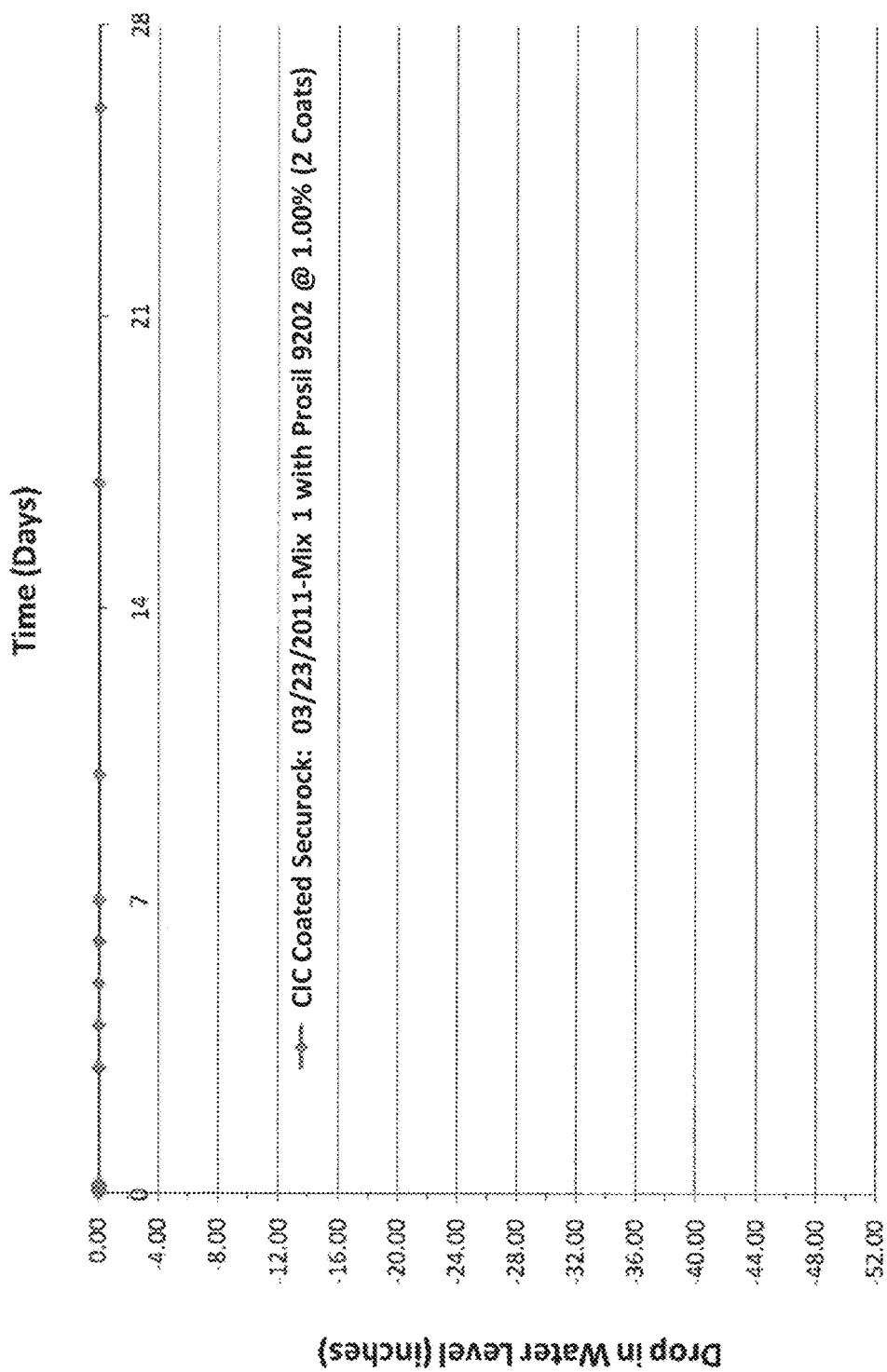
FIG. 7A is a graph of drop in water level (inches) versus time (days), which illustrates water penetration resistance testing for finished glass mat reinforced gypsum panel of Sample F set forth in Example 7.
Figure 7B:
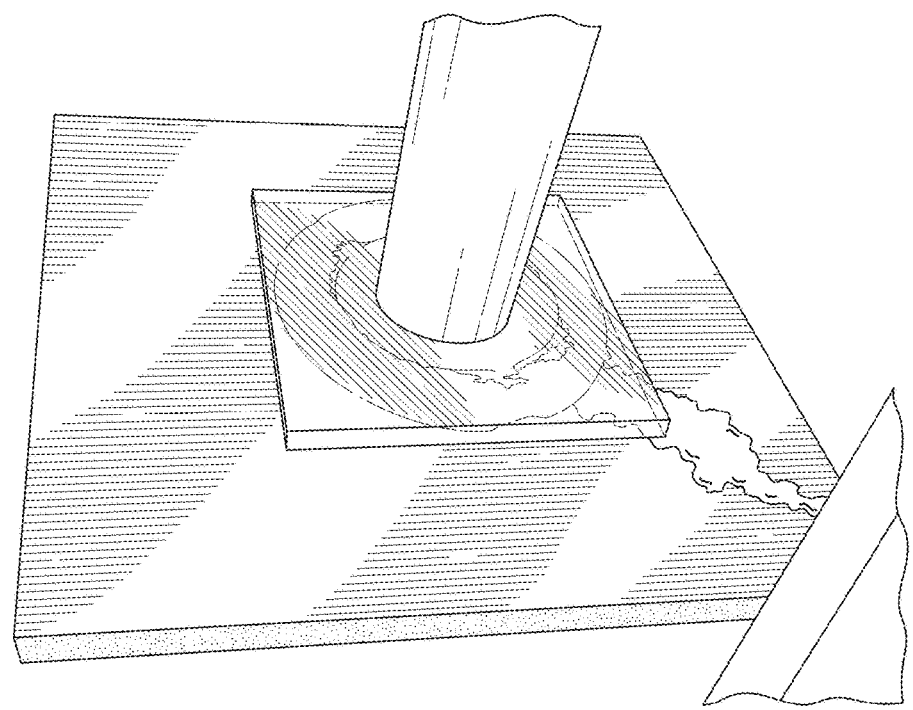
FIG. 7B illustrates water penetration resistance testing for finished glass mat reinforced gypsum panel of Sample F set forth in Example 7.

FIG. 7A shows water penetration resistance testing results for the finished glass mat reinforced gypsum panel of Sample F. The drop in water level in the plastic tube as a function of time was measured and recorded. From FIG. 7A it can be observed that the application of finish of embodiments of the invention had a significant influence on improving the water penetration resistance performance of the panel. It is noteworthy that there was no water penetration that occurred though the panel. No leakage or water droplets were observed on the top finished surface of the panel, as seen in FIG. 7B. Also, there was no evidence of water penetration through the thickness of the panel. The panel bottom surface remained completely dry throughout the duration of the test. The drop in water level in the tube as a function of time was measured and recorded as set forth in Table 29.

TABLE 29

| 3-Day Drop in Water Level | 0.00 inches |
|---|---|
| 14-Day Drop in Water Level | 0.00 inches |
| 28-Day Drop in Water Level | 0.00 inches |

This Example demonstrates that the flexible cementitious composition in accordance with embodiments of the invention comprising silane such as octyl triethoxysilane provided very good water penetration resistance to the finished glass mat panels.

Example 8

This Example illustrates improved water resistance for finished panels in accordance with embodiments of the invention. The finished glass mat panel of this invention was prepared using a special flexible cementitious finish having formulation as shown in Table 30. In particular, this Example illustrates the influence of silane such as octyl triethoxysilane on water resistance of the thin, flexible cementitious finish of embodiments of the invention. Octyl triethoxysilane was added at a dosage rate of 0.99% of the total weight of the formulation (or 1.50 wt % of fly ash amount). Half inch thick SECUROCK® roof board was used as the base panel for application of the cementitious finish. The glass mat used for manufacturing the gypsum panels was substantially porous and was surface bonded to the gypsum core with no added finish initially present.

The raw materials shown in Table 30 were mixed together in a blender for about 30 seconds. The resulting aqueous finish was screeded onto the top surface of a ½" thick glass mat reinforced gypsum panel. Two passes of finish were applied on the panel. The application of the second pass of finish was done immediately after the application of the first pass. The resulting panel was identified as Sample G. The finish was allowed to cure and dry under ambient conditions. It took approximately 30 minutes for the finish to dry out and give the panel a non-sticky surface.

TABLE 30

| Finish formulation used to finish panel (Sample G) | |
|---|---|
| Ingredient | Wt % |
| Fly ash Class C | 66.16% |
| FORTON VF 774 Liquid Polymer | 32.43% |
| Ajack Black SC | 0.08% |
| Superplasticizer-Melflux 267L | 0.33% |
| Octyl Triethoxysilane - Prosil 9202 | 0.99% |

The details of the cementitious finish applied on the glass mat panel (Sample G) were as set forth in Table 31.

TABLE 31

| Number of finish passes | Two |
|---|---|
| Finish thickness | 15 mils |
| Finish weight | 93 lb/MSF |

TABLE 31-continued

| Density of finished glass mat composite | 91 pcf |
|---|---|
| Finish penetration depth through the glass mat | >90% |

A water resistance test was conducted as described in Example 1 with the test equipment arrangement shown in FIG. 1A.

Figure 8A:
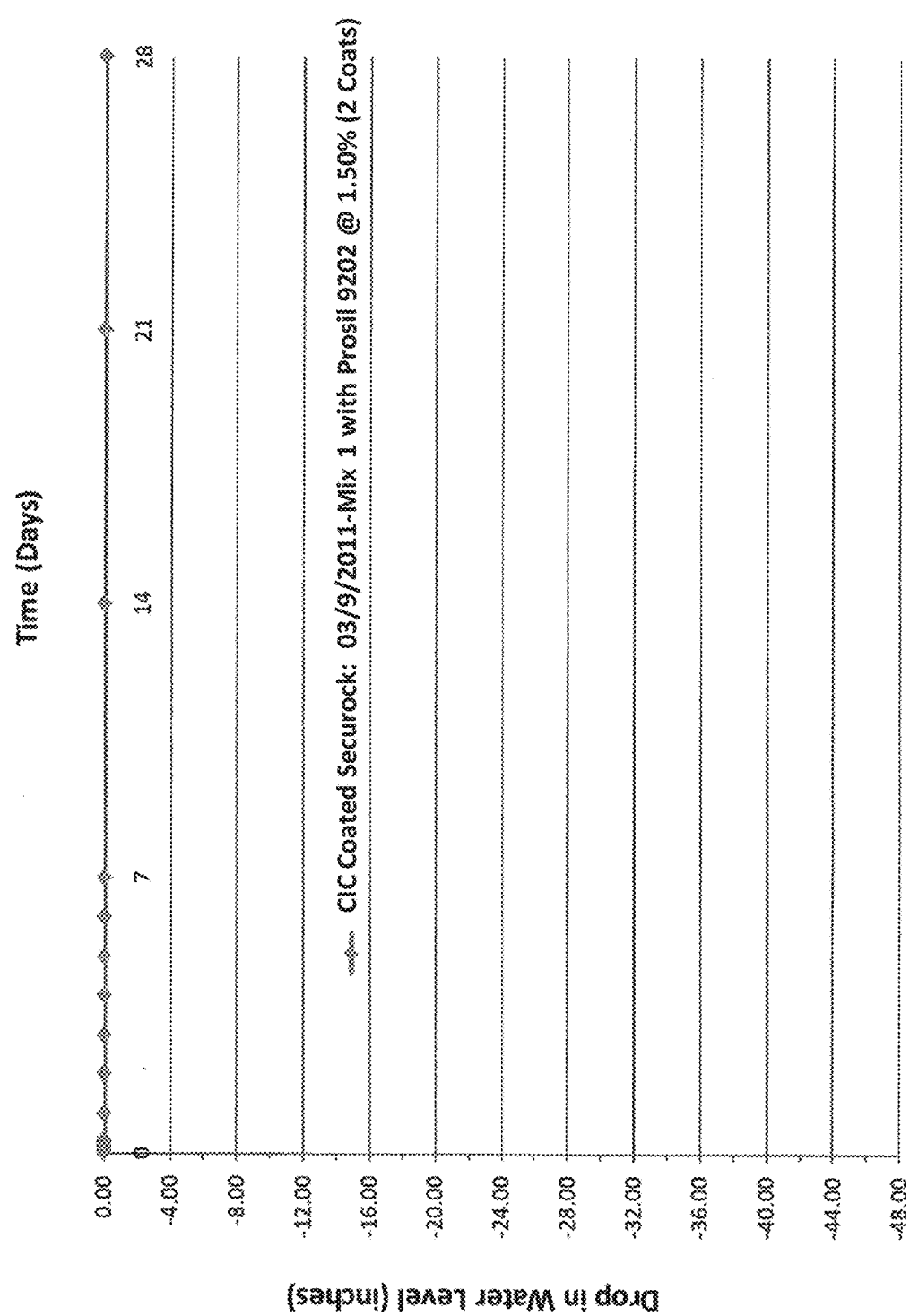
FIG. 8A is a graph of drop in water level (inches) versus time (days), which illustrates water penetration resistance testing for finished glass mat reinforced gypsum panel of sample G set forth in Example 8.
Figure 8B:
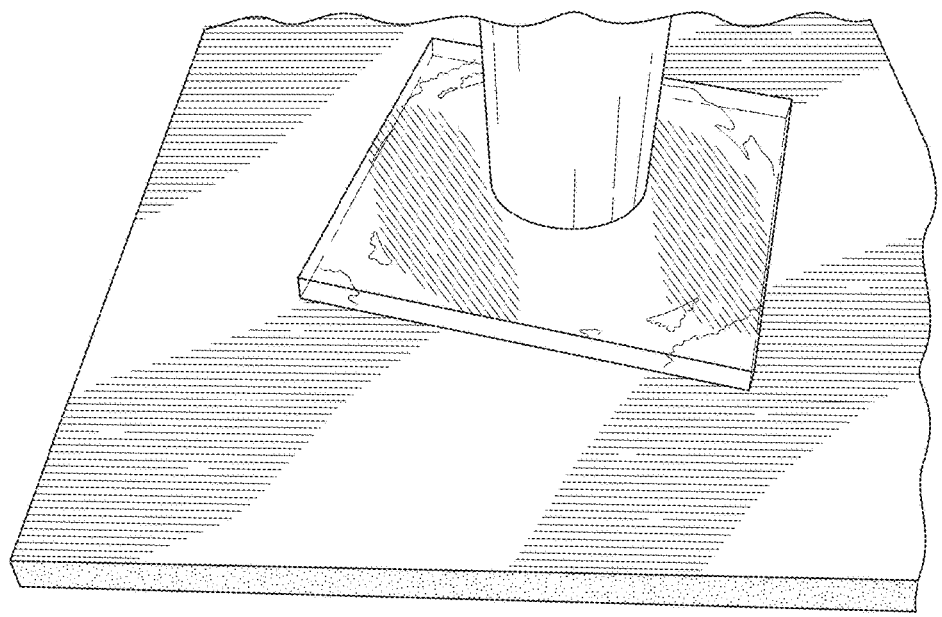
FIG. 8B illustrates water penetration resistance testing for finished glass mat reinforced gypsum panel of sample G set forth in Example 8.

FIG. 8A shows water penetration resistance testing results for the finished glass mat reinforced gypsum panel of Sample G. The drop in water level in the plastic tube as a function of time was measured and recorded. From FIG. 8A it can be observed that the application of finish of embodiments of the invention had a significant influence on improving the water penetration resistance performance of the panel. It is noteworthy that there was no water penetration that occurred though the panel. No leakage or water droplets were observed on the top finished surface of the panel, as seen in FIG. 8B. Also, there was no evidence of water penetration through the thickness of the panel. The panel bottom surface remained completely dry throughout the duration of the test. The drop in water level in the tube as a function of time was measured and recorded as set forth in Table 32.

TABLE 32

| 3-Day Drop in Water Level | 0.00 inches |
|---|---|
| 14-Day Drop in Water Level | 0.00 inches |
| 28-Day Drop in Water Level | 0.00 inches |

This Example illustrates that the flexible cementitious composition in accordance with embodiments of the invention comprising octyl triethoxysilane provided a high level of good water penetration resistance to the finished glass mat panels.

Example 9

This Example illustrates improved water resistance for finished panels in accordance with embodiments of the invention. The finished glass mat panel in accordance with embodiments of the invention was prepared using a special flexible cementitious finish having formulation as shown in Table 33. In particular, this Example illustrates the influence of silane such as octyl triethoxysilane on water resistance of the thin, flexible cementitious finish of this invention. Octyl triethoxysilane was added at a dosage rate of 1.97% of the total weight of the formulation (or 3.00 wt % of fly ash amount).

Half inch thick SECUROCK® roof board was used as the base panel for application of the cementitious finish. The glass mat used for manufacturing the gypsum panels was substantially porous and was surface bonded to the gypsum core with no added finish initially present.

The raw materials shown in Table 33 were mixed together in a blender for about 30 seconds. The resulting aqueous finish was screeded onto the top surface of a ½" thick glass mat reinforced gypsum panel. Two passes of finish were applied on the panel. The application of the second pass of finish was done immediately after the application of the first pass. The resulting panel was identified as Sample H. The finish was allowed to cure and dry under ambient conditions. It took approximately 30 minutes for the finish to dry out and give the panel a non-sticky surface.

TABLE 33

Finish formulation used to finish panel (Sample H)

| Ingredient | Wt % |
| --- | --- |
| Fly ash Class C | 65.51% |
| FORTON VF 774 Liquid Polymer | 32.11% |
| Ajack Black SC | 0.08% |
| Superplasticizer-Melflux 267L | 0.33% |
| Octyl Triethoxysilane - Prosil 9202 | 1.97% |

The details of the cementitious finish applied on the glass mat panel (Sample H) were as set forth in Table 34.

TABLE 34

| | |
| --- | --- |
| Number of finish passes | Two |
| Finish thickness | 15 mils |
| Finish weight | 90 lb/MSF |
| Density of finished glass mat composite | 92 pcf |
| Finish penetration depth through the glass mat | >90% |

A water resistance test was conducted as described in Example 1 with the test equipment arrangement shown in FIG. 1A.

Figure 9A:
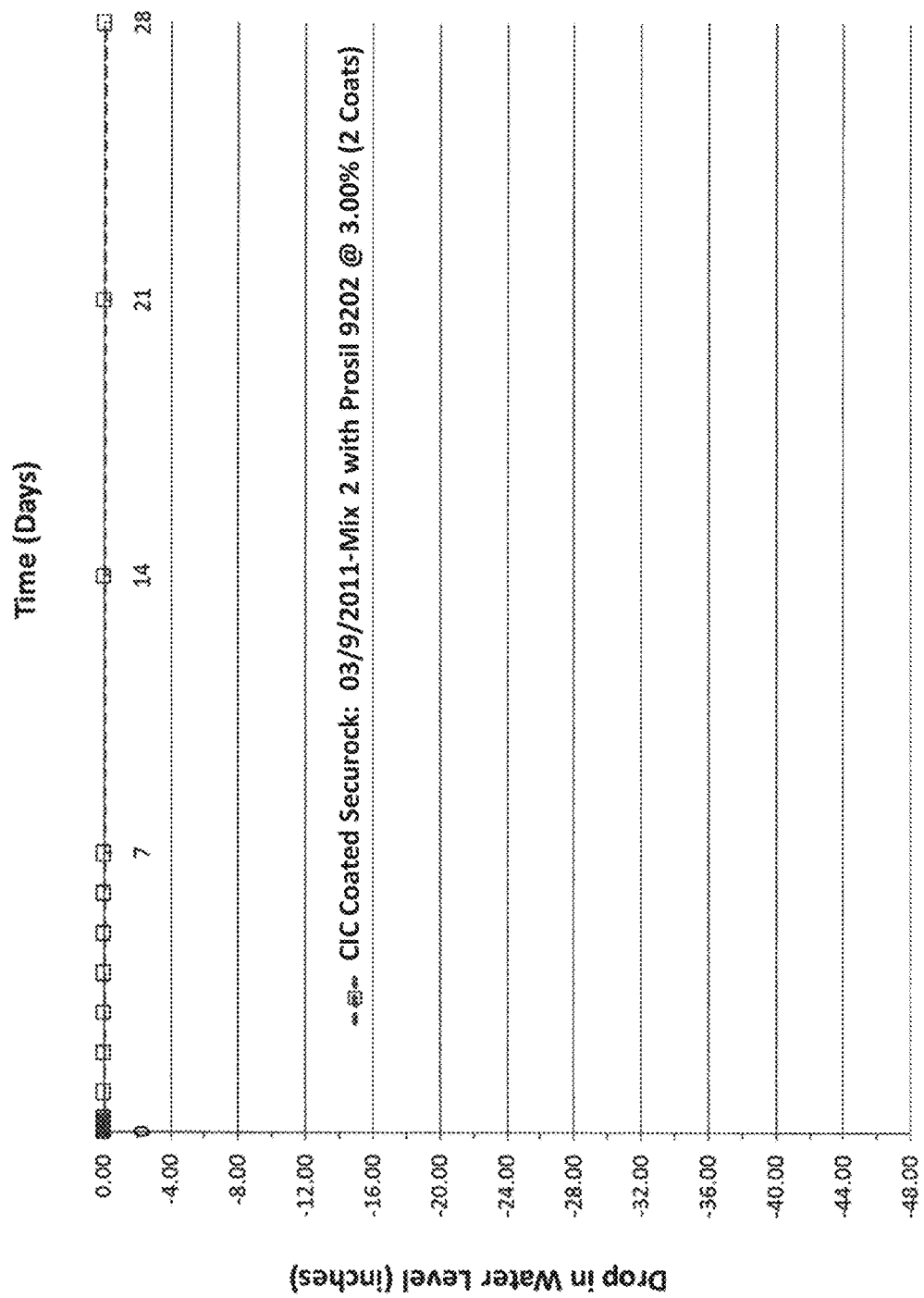
FIG. 9A is a graph of drop in water level (inches) versus time (days), which illustrates water penetration resistance testing for finished glass mat reinforced gypsum panel of Sample H set forth in Example 9.
Figure 9B:
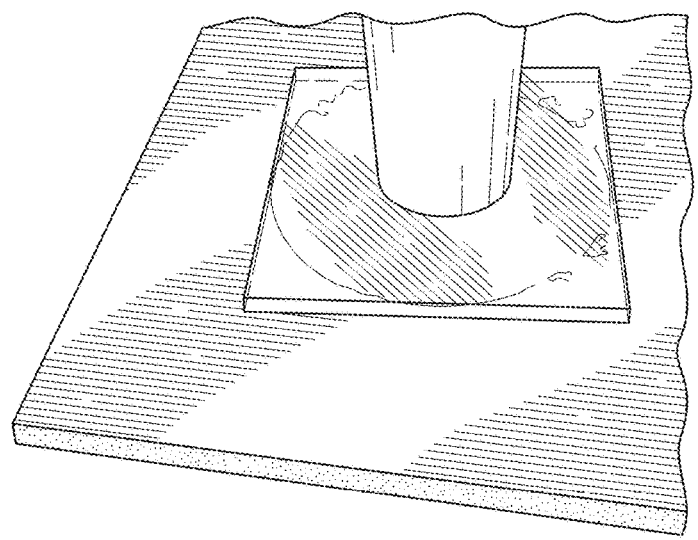
FIG. 9B illustrates water penetration resistance testing for finished glass mat reinforced gypsum panel of Sample H set forth in Example 9.

FIG. 9A shows water penetration resistance testing results for the finished glass mat reinforced gypsum panel of Sample H. The drop in water level in the plastic tube as a function of time was measured and recorded. From FIG. 9A it can be observed that the application of finish of embodiments of the invention had a significant influence on improving the water penetration resistance performance of the panel. It is noteworthy that there was no water penetration that occurred though the panel. No leakage or water droplets were observed on the top finished surface of the panel, FIG. 9B. Also, there was no evidence of water penetration through the thickness of the panel. The panel bottom surface remained completely dry throughout the duration of the test. The drop in water level in the tube as a function of time was measured and recorded as set forth in Table 35.

TABLE 35

| | |
| --- | --- |
| 3-Day Drop in Water Level | 0.00 inches |
| 14-Day Drop in Water Level | 0.00 inches |
| 28-Day Drop in Water Level | 0.00 inches |

This Example demonstrates that the flexible cementitious composition of the invention comprising silane such as octyl triethoxysilane provided a high level of water penetration resistance to the finished glass mat panels.

Example 10

This Example illustrates the mechanical properties required by ASTM C1178 (Standard Specifications for Coated Glass Mat Water-Resistant Gypsum Backing Panel achieved by the finished glass mat panel in accordance with embodiments of the invention. The glass mat panels were finished using a special flexible cementitious finish having formulation including silane as shown in Table 36.

The specimens were tested in accordance with ASTM C473 (Standard Test Methods for Physical Testing of Gypsum Panel Products). Octyl triethoxysilane was added at a dosage rate of 0.99% of the total weight of the formulation (or 1.50 wt % of fly ash amount).

Half inch thick SECUROCK® roof board was used as the base panel for application of the cementitious finish. The glass mat used for manufacturing the gypsum panels was substantially porous, and was surface bonded to the gypsum core. The results are shown in Table 37.

The raw materials shown in Table 36 were mixed together in a blender for about 30 seconds. The resulting aqueous finish was screeded onto the top surface of a ½" thick glass mat reinforced gypsum panel. Two passes of finish were applied on the panel. The application of the second pass of finish was done immediately after the application of the first pass. The resulting panel was identified as Sample I. The finish was allowed to cure and dry under ambient conditions. It took approximately 30 minutes for the finish to dry out and give the panel a non-sticky surface.

TABLE 36

Finish formulation used to finish panel (Sample I)

| Ingredient | Wt % |
| --- | --- |
| Fly ash Class C | 66.16% |
| FORTON VF 774 Liquid Polymer | 32.43% |
| Ajack Black SC | 0.08% |
| Superplasticizer, Melflux 267L | 0.33% |
| Octyl Triethoxysilane - Prosil 9202 | 0.99% |

The results are shown in Table 37.

TABLE 37

| Test | Minimum Specification per ASTM C1178 | Test result |
| --- | --- | --- |
| Flexural Strength | MD 100 lbf; XMD 80 lbf | MD 156 lbf; XMD 104 lbf |
| Humidified Deflection | <=2 in | <0.125 in |
| Core Hardness | >15 lbf | 42 lbf |
| End Hardness | >15 lbf | 35 lbf |
| Edge Hardness | >15 lbf | 27 lbf |
| Nail Pull Resistance | >70 lbf | 104 lbf |
| Water Resistance | <=5% of weight | 4% of weight |
| Surface Water Absorption | <0.5 g | 0.098 g |

As seen from Table 37, this Example illustrates that the finished sample exceeded the minimum standards set forth in ASTM C1178.

Example 11

This Example illustrates the nail pull resistance, flexural strength, and bond for a finished glass mat panel in accordance with embodiments of the invention. The panel was prepared using a special flexible cementitious finish having formulation including silane as shown in Table 38. Octyl triethoxysilane was added at a dosage rate of 0.99% of the total weight of the formulation (or 1.50 wt % of fly ash amount). Half inch thick SECUROCK® roof board was used as the base panel for application of the cementitious finish. The glass mat used for manufacturing the gypsum panels was substantially porous, and was surface bonded to the gypsum core with no added finish initially present.

In particular, the board samples were tested for both "as-is" (prior to water exposure) and "7 day wet surface" conditions. The wet surface condition was achieved by submerging the coated surface of the panel with a pool of water ¼~½" deep contained by plastic bars and sealant. Water was added constantly to maintain the water level.

The raw materials shown in Table 38 were mixed together in a blender for about 30 seconds. The resulting aqueous finish was screeded onto the top surface of ½" thick glass mat reinforced gypsum panel. Two passes of finish were applied on the panel. The second pass of finish was applied immediately after the application of the first pass. The resulting panel was identified as Sample J. The finish was allowed to cure and dry under ambient conditions. It took approximately 30 minutes for the finish to dry out and give the panel a non-sticky surface.

TABLE 38

Finish formulation used to finish panel (Sample J)

| Ingredient | Wt % |
|---|---|
| Fly ash Class C | 66.16% |
| FORTON VF 774 Liquid Polymer | 32.43% |
| Ajack Black SC | 0.08% |
| Superplasticizer-Melflux 267L | 0.33% |
| Octyl Triethoxysilane - Prosil 9202 | 0.99% |

Figure 10A:
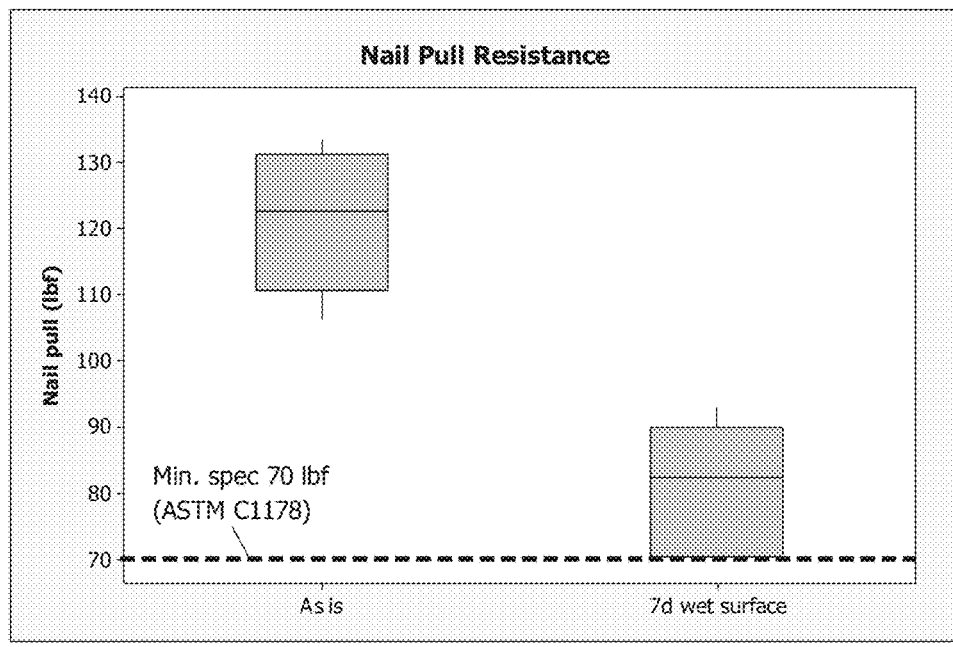
FIG. 10A illustrates nail pull resistance testing for finished glass mat reinforced gypsum panel of sample J set forth in Example 11 both without water exposure (i.e., "as is") and after the coated surface had been wetted for 7 days.

The nail pull resistance result is shown in FIG. 10A. The resistance for 121 lbf was the "as-is" condition, and 81 lbf after the coated surface had been wetted for 7 days. In some embodiments, it is desired to exceed about 70 lbf. This Example illustrates that, due to the high level of water resistance of the finish, desired nail pull resistance results are still observed even after the wetting exposure.

Figure 10B:
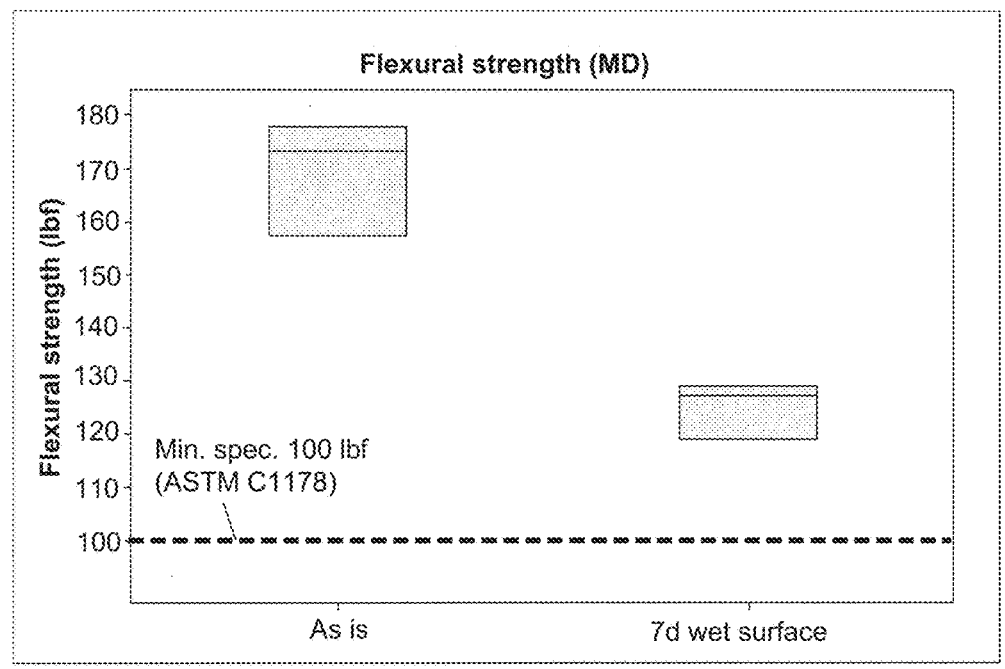
FIG. 10B illustrates flexural strength testing for finished glass mat reinforced gypsum panel of sample J both without water exposure (i.e., "as is") and after the coated surface had been wetted for 7 days.

In addition, flexural strength was determined for "as-is" condition and after 7 days of wetting the finished surface. As seen in FIG. 10B, the flexural strength for the machine direction (MD) was 170 lbf and 125 lbf for the two conditions respectively, and exceeds a minimum requirement of about 100 lbf in accordance with some embodiments of the invention.

Furthermore, tile bond was also determined under an "as-is" condition and after 7 days of wetting the coated surface. The tiles were attached to the finished side of the board by Laticrete 253R polymer modified thinset mortar commercially available from Laticrete International, Inc., Bethany, Conn. and the coated glass mat tile backer was screwed to oriented strand board (OSB), to approximate field construction.

Figure 10C:
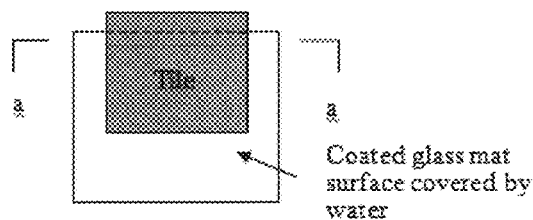
FIGS. 10C and 10D schematically illustrate an arrangement for tile bond testing as described in Example 11, in a top view of the arrangement and (FIG. 10C), and in a cross-sectional view of the arrangement (FIG. 10D).
Figure 10D:
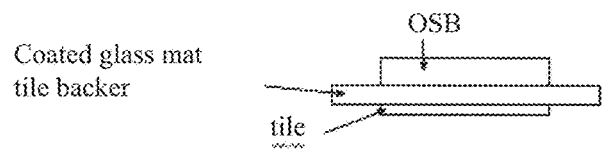
Figure 10E:
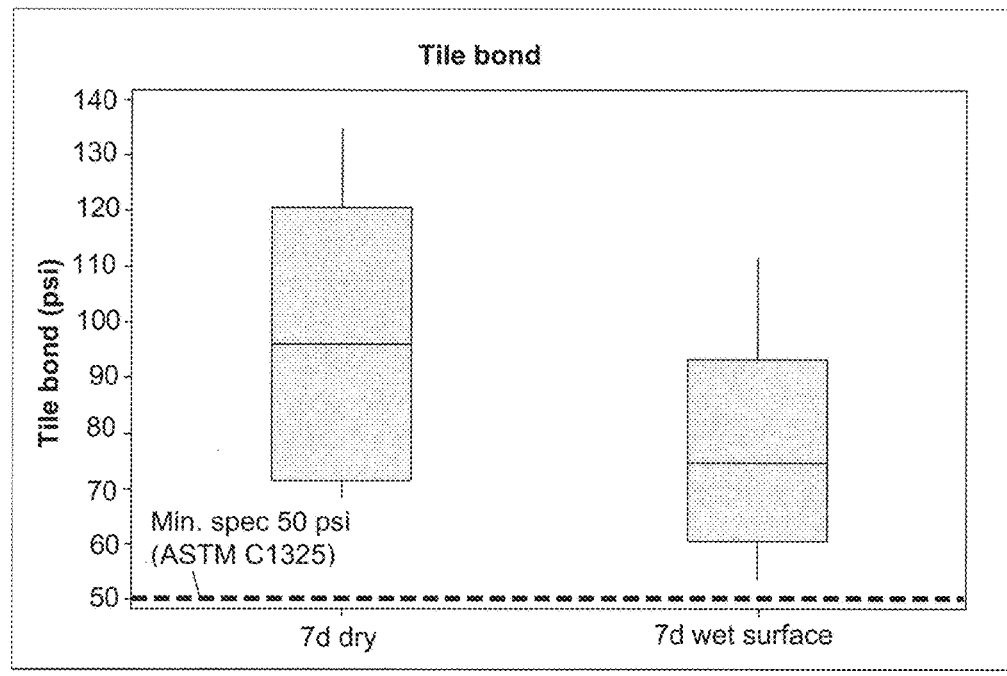
FIG. 10E is a graph illustrating tile bond testing for finished glass mat reinforced gypsum panel of sample J from Example 11 both without water exposure (i.e., "as is") and after the coated surface had been wetted for 7 days.

For the 7 day wet surface condition, the test assembly was prepared with the finished glass mat board extending beyond the tiles, so the panel surface could be wetted by water for 7 days, as seen in FIGS. 10C and 10D. This test arrangement was designed to mimic field condition where the panel surface gets wet after tiles are installed. The results can be seen in FIG. 10E. The tile bond results for the "as-is" condition was 97 psi, and for the 7 day wet surface condition it was 77 psi. In some embodiments, it is desired to exceed a minimum requirement of about 50 psi. Because of the good water resistance exhibited by embodiments of the invention, the tile bond results were seen to still be desirable even after the water exposure. This ensures that the tiles will stay in place even when the surface has been wetted for extended period of time.

Example 12

This Example illustrates the tensile strength of a finished glass mat in accordance with embodiments of the invention after accelerated aging. In particular, since class C fly ash is highly alkaline and can potentially degrade the glass mat, this Example illustrates the long term performance of the glass mat after extended exposure to the slurry. Glass mat was hand finished onto both sides with the slurry prepared according to Table 39.

The raw materials shown in Table 39 were mixed together in a blender for about 30 seconds. The resulting aqueous finish was screeded on both surfaces of a glass mat. The finish was allowed to cure and dry under ambient conditions.

TABLE 39

Finish formulation used to finish panel (Sample K)

| Ingredient | Wt % |
|---|---|
| Fly ash Class C | 66.16% |
| FORTON VF 774 Liquid Polymer | 32.43% |
| Ajack Black SC | 0.08% |
| Superplasticizer, Melflux 267L | 0.33% |
| Octyl Triethoxysilane - Prosil 9202 | 0.99% |

The coated glass mat was submerged in 140° F. (60° C.) water to accelerate the aging process. The soaking time was 7 days, 14 days, 28 days, and 56 days, followed by 7 days of oven drying at 110° F. (43.3° C.). Tensile strength was conducted for the "as-is" condition and for the aged glass mat. Five 2"×8" samples were cut in the machine direction for each condition, and in the center they were trimmed to 1" width. The samples were tested on a close-loop, servo-controlled MTS testing machine (CMTS) with a cross-head speed of 2 in/min, and the tensile strength was reported in pound force per liner inch.

Figure 11:
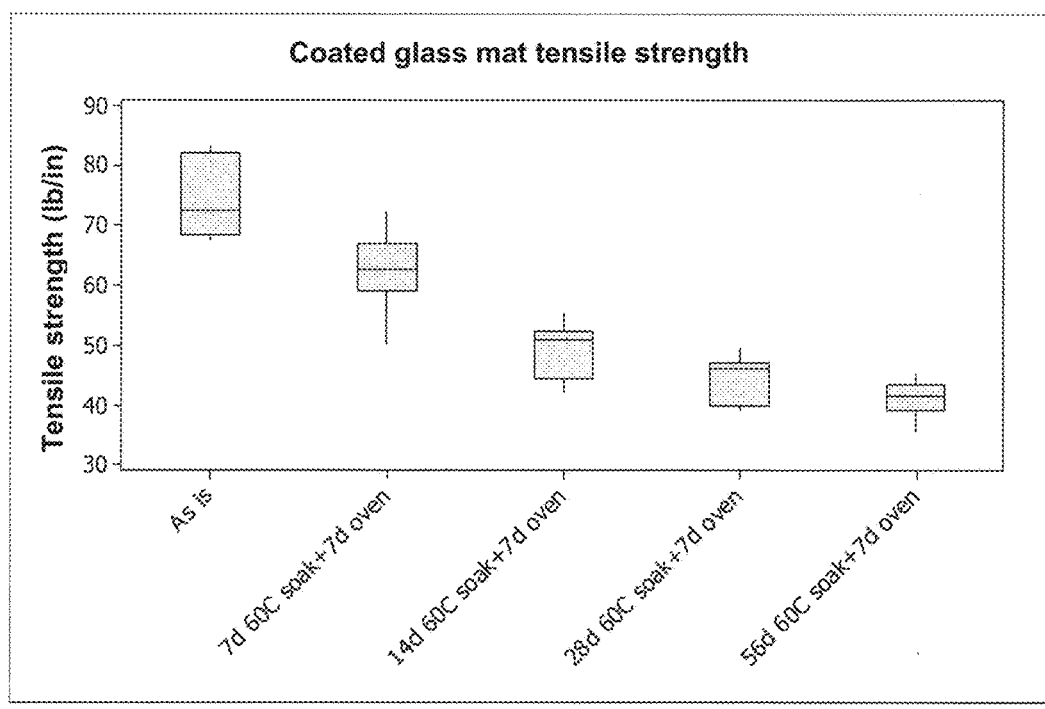
FIG. 11 is a graph illustrating tensile strength testing for finished glass mat reinforced gypsum panel of sample K from Example 12, both without water exposure (i.e., "as is"), and after water exposure simulating aging.

The tensile strength results are shown in FIG. 11. The "as-is" tensile strength was 74 lb/in, and reduced to 62 lb/in after 7 days of hot water soaking. The tensile strength was further reduced to 49, 44, and 41 lb/in after 14 day, 28 day, and 56 day of accelerated aging, respectively. This indicates that the glass mat still retains more than 50% of its original strength after accelerated aging of 56 days, even though the glass mat is only slightly coated with sizing prior to slurry application. This ensures that the coated glass mat tile backer will have satisfactory performance after being in service for extended time.

All references, including publications, ASTM and ANSI standards, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:
1. A mat-faced gypsum board comprising:
  (a) gypsum-based core;
  (b) fibrous mat having (i) an inner surface in direct contact with at least one face of the gypsum-based core and (ii) an opposite outer surface; and
  (c) a continuous hydrophobic finish in direct contact with the outer surface of the fibrous mat, the hydrophobic finish prepared from a wet hydrophobic finish composition comprising:
    (i) Class C fly ash, wherein the Class C fly ash is in an amount from about 50% to about 85% by weight of the wet hydrophobic finish composition,
    (ii) film-forming polymer, wherein the film-forming polymer is in an amount from about 5% to about 25% by weight of the wet hydrophobic finish composition, and
    (iii) silane compound of the general chemical formula:

$(RO)_3$—Si—X, where RO is an alkoxy group and X is an organofunctional group,
  wherein the wet hydrophobic finish composition has a pH of at least about 9, and wherein the wet hydrophobic finish composition is substantially free of any other hydraulic material other than the Class C fly ash,
  wherein the film-forming polymer is selected from the group consisting of acrylic polymers and copolymers formed from methyl acrylate, methyl methacrylate, ethyl acrylate, ethyl methacrylate, butyl acrylate, butyl methacrylate, propyl acrylate, propyl methylacrylate, 2-ethyl hexyl acrylate and methacrylate, cyclohexyl acrylate and methacrylate, decyl-acrylate and methacrylate, isodecylacrylate and methacrylate, benzyl acrylate and methacrylate, copolymers of styrene and acrylic, copolymers of vinyl acetate and VeoVa (vinyl ester of versatic acid), copolymers of vinyl laurate and ethylene, terpolymers of vinyl acetate, ethylene and methylmethacrylate, terpolymers of vinyl acetate, ethylene and vinyl laurate, terpolymers of vinyl acetate, ethylene and VeoVa (vinyl ester of versatic acid), and any combination thereof,
  wherein the board passes the test for waterproofness according to ANSI A118.10 (revised October 2008).

2. The mat-faced gypsum board of claim 1, wherein, when the mat-faced gypsum board is cast as ½" thick board, the mat-faced gypsum board has a nail pull resistance of at least about 70 pounds in accordance with ASTM C1178/C1178M-11.

3. The mat-faced gypsum board of claim 1, wherein, when the mat-faced gypsum board is cast as ½" thick board, the mat-faced gypsum board has a flexural strength of at least about 80 pounds bearing edges parallel to the board edge and/or at least about 100 pounds bearing edges perpendicular to the board edge, in accordance with ASTM C1178/C1178M-11.

4. The mat-faced gypsum board of claim 1, wherein RO is methoxy or ethoxy.

5. The mat-faced gypsum board of claim 1, wherein X is methyl, ethyl, propyl, butyl, pentyl, hexyl or octyl.

6. The mat-faced gypsum board of claim 1, wherein the silane compound is in an amount from about 0.1% to about 5% by weight of the wet hydrophobic finish composition.

7. The mat-faced gypsum board of claim 1, wherein the silane compound comprises one or more of octyltriethoxy silane, isooctyltriethoxy silane, octyltrimethoxy silane, isooctyltrimethoxy silane, butyltriethoxy silane, isobutyltriethoxy silane, butyltrimethoxy silane, or isobutyltrimethoxy silane.

8. The mat-faced gypsum board of claim 1, wherein the fibrous mat and hydrophobic finish form a composite having a thickness of about 0.03 inches or less, and/or a density from about 75 to about 115 pcf.

9. The mat-faced gypsum board of claim 1, wherein the hydrophobic finish has a weight from about 60 lb/MSF to about 160 lb/MSF.

10. The mat-faced gypsum board of claim 1, wherein the finish penetrates at least about 60% into the fibrous mat.

11. The mat-faced gypsum board of claim 1, wherein the fibrous mat comprises two parts, one on either side of the gypsum-based core.

12. The mat-faced gypsum board of claim 11, wherein the hydrophobic finish is in direct contact with the outer surface of both parts of the fibrous mat.

13. The mat-faced gypsum board of claim 1, wherein:
  the film-forming polymer is in an amount from about 10% to about 25% by weight of the wet hydrophobic finish composition;
  the silane compound is an alkyl alkoxysilane in an amount from about 0.1% to about 5% by weight of the wet hydrophobic finish composition;
  when the mat-faced gypsum board is cast as ½" thick board, the mat-faced gypsum board has a nail pull resistance of at least about 70 pounds in accordance with ASTM C1178/C1178M-11;
  when the mat-faced gypsum board is cast as ½" thick board, the mat-faced gypsum board has a flexural strength of at least about 80 pounds bearing edges parallel to the board edge and/or at least about 100 pounds bearing edges perpendicular to the board edge, in accordance with ASTM C1178/C1178M-11.

14. The mat-faced gypsum board of claim 13, wherein:
  the fibrous mat and the hydrophobic finish form a composite having a thickness from about 0.0075 to about 0.04 inches and a density from about 65 to about 125 pcf;
  the hydrophobic finish has a weight from about 40 to about 200 lb/MSF;
  the hydrophobic finish penetrates at least about 60% into the mat; and
  the Class C fly ash has a calcium oxide content of at least about 15% by weight of the fly ash.

15. The mat-faced gypsum board of claim 14, wherein:
the wet hydrophobic finish composition substantially sets and dries in about 45 minutes or less under conditions of about 75° F. and about 50% relative humidity; and/or the wet hydrophobic finish composition substantially sets and dries in about 3 minutes or less at a temperature of about 175° F.

16. A mat-faced gypsum board comprising:
(a) gypsum-based core;
(b) fibrous mat comprising polymer or mineral fiber, wherein the mat has (i) an inner surface in direct contact with at least one face of the gypsum-based core, and (i) an opposite outer surface; and
(c) a continuous hydrophobic finish in direct contact with the outer surface of the fibrous mat, the hydrophobic finish prepared from a wet hydrophobic finish composition consisting essentially of:
(i) Class C fly ash, wherein the Class C fly ash is in an amount from about 50% to about 85% by weight of the wet hydrophobic finish composition,
(ii) one or more of the following film-forming polymers: acrylic polymers and copolymers formed from methyl acrylate, methyl methacrylate, ethyl acrylate, ethyl methacrylate, butyl acrylate, butyl methacrylate, propyl acrylate, propyl methylacrylate, 2-ethyl hexyl acrylate and methacrylate, cyclohexyl acrylate and methacrylate, decyl-acrylate and methacrylate, isodecylacrylate and methacrylate, benzyl acrylate and methacrylate, copolymers of styrene and acrylic, copolymers of vinyl acetate and VeoVa (vinyl ester of versatic acid), copolymers of vinyl laurate and ethylene, terpolymers of vinyl acetate, ethylene and methylmethaacrylate, terpolymers of vinyl acetate, ethylene and vinyl laurate, terpolymers of vinyl acetate, ethylene and VeoVa (vinyl ester of versatic acid), or any combination thereof, wherein the film-forming polymer is in an amount from about 5% to about 25% by weight of the wet hydrophobic finish composition, and
(iii) alkyl alkoxysilane in an amount from about 0.1% to about 5% by weight of the wet hydrophobic finish composition,
wherein the wet hydrophobic finish composition has a pH of at least about 9 and wherein the wet hydrophobic finish composition is substantially free of any other hydraulic material other than the Class C fly ash,
wherein the board passes the test for waterproofness according to ANSI A118.10 (revised October 2008).

17. A mat-faced gypsum board comprising:
(a) gypsum-based core;
(b) fibrous mat having an inner surface in direct contact with at least one face of the gypsum-based core and an opposite outer surface; and
(c) a continuous hydrophobic finish in direct contact with the outer surface of the fibrous mat, the hydrophobic finish prepared from a wet hydrophobic finish composition comprising
(i) Class C fly ash, wherein the Class C fly ash is in an amount from about 50% to about 85% by weight of the wet hydrophobic finish composition,
(ii) film-forming polymer, wherein the film-forming polymer is in an amount from about 5% to about 25% by weight of the wet hydrophobic finish composition, and
(iii) silane compound having a molecular weight of at least about 150,
wherein the wet hydrophobic finish composition has a pH of at least about 9 and wherein the wet hydrophobic finish composition is substantially free of any other hydraulic material other than the Class C fly ash,
wherein the film-forming polymer is selected from the group consisting of acrylic polymers and copolymers formed from methyl acrylate, methyl methacrylate, ethyl acrylate, ethyl methacrylate, butyl acrylate, butyl methacrylate, propyl acrylate, propyl methylacrylate, 2-ethyl hexyl acrylate and methacrylate, cyclohexyl acrylate and methacrylate, decyl-acrylate and methacrylate, isodecylacrylate and methacrylate, benzyl acrylate and methacrylate, copolymers of styrene and acrylic, copolymers of vinyl acetate and VeoVa (vinyl ester of versatic acid), copolymers of vinyl laurate and ethylene, terpolymers of vinyl acetate, ethylene and methylmethacrylate, terpolymers of vinyl acetate, ethylene and vinyl laurate, terpolymers of vinyl acetate, ethylene and VeoVa (vinyl ester of versatic acid), and any combination thereof, and wherein the film-forming polymer is in an amount from about 5% to about 25% by weight of the wet hydrophobic finish composition,
wherein the board passes the test for waterproofness according to ANSI A118.10 (revised October 2008).

18. An article comprising:
(a) gypsum-based core;
(b) fibrous mat having (i) an inner surface in direct contact with at least one face of the gypsum-based core and (ii) an opposite outer surface; and
(c) a continuous hydrophobic finish in direct contact with the outer surface of the fibrous mat, wherein the hydrophobic finish prepared from a wet hydrophobic finish composition comprising
(i) Class C fly ash, wherein the Class C fly ash is in an amount from about 50% to about 85% by weight of the wet hydrophobic finish composition,
(ii) film-forming polymer, wherein the film-forming polymer is in an amount from about 5% to about 25% by weight of the wet hydrophobic finish composition, and
(iii) silane compound of the general formula:

$$(RO)_3-Si-X,$$

where RO is an alkoxy group and X is an organofunctional group,
wherein the wet hydrophobic finish composition has a pH of at least about 9 and wherein the wet hydrophobic finish composition is substantially free of any other hydraulic material other than the Class C fly ash,
wherein the film-forming polymer is selected from the group consisting of acrylic polymers and copolymers formed from methyl acrylate, methyl methacrylate, ethyl acrylate, ethyl methacrylate, butyl acrylate, butyl methacrylate, propyl acrylate, propyl methylacrylate, 2-ethyl hexyl acrylate and methacrylate, cyclohexyl acrylate and methacrylate, decyl-acrylate and methacrylate, isodecylacrylate and methacrylate, benzyl acrylate and methacrylate, copolymers of styrene and acrylic, copolymers of vinyl acetate and VeoVa (vinyl ester of versatic acid), copolymers of vinyl laurate and ethylene, terpolymers of vinyl acetate, ethylene and methylmethacrylate, terpolymers of vinyl acetate, ethylene and vinyl laurate, terpolymers of vinyl acetate, ethylene and VeoVa (vinyl ester of versatic acid), and any combination thereof,
wherein the article passes the test for waterproofness according to ANSI A118.10 (revised October 2008).

* * * * *